(12) United States Patent
Clucas

(10) Patent No.: US 11,290,733 B2
(45) Date of Patent: Mar. 29, 2022

(54) PHYSICAL ADAPTER, SIGNAL PROCESSING EQUIPMENT, METHODS AND COMPUTER PROGRAMS

(71) Applicant: V-NOVA INTERNATIONAL LTD, London (GB)

(72) Inventor: Richard Clucas, London (GB)

(73) Assignee: V-NOVA INTERNATIONAL LIMITED, London (GB)

( * ) Notice: Subject to any disclaimer, the term of this patent is extended or adjusted under 35 U.S.C. 154(b) by 188 days.

(21) Appl. No.: 16/103,784

(22) Filed: Aug. 14, 2018

(65) Prior Publication Data

US 2019/0014335 A1    Jan. 10, 2019

Related U.S. Application Data

(63) Continuation of application No. PCT/GB2017/050405, filed on Feb. 16, 2017.

(30) Foreign Application Priority Data

Feb. 17, 2016    (GB) ..................... 1602820

(51) Int. Cl.
*H04N 19/42*    (2014.01)
*H04N 21/43*    (2011.01)
(Continued)

(52) U.S. Cl.
CPC ............ *H04N 19/42* (2014.11); *H04L 65/80* (2013.01); *H04N 19/31* (2014.11); *H04N 19/44* (2014.11);
(Continued)

(58) Field of Classification Search
CPC ...... H04N 19/70; H04N 19/30; H04N 19/597; H04N 19/46; H04N 19/40; H04N 19/1883;
(Continued)

(56) References Cited

U.S. PATENT DOCUMENTS 6,081,295 A * 6/2000 Adolph .................. H04N 19/40
                                                    375/240.03
6,330,280 B1 * 12/2001 Suzuki ................. H04N 19/563
                                                    375/240.08
(Continued)

FOREIGN PATENT DOCUMENTS

EP        2026558 A1    2/2009
WO    2012120068 A1    9/2012
(Continued)

OTHER PUBLICATIONS

Seiki U-Vision Cable Amazon.co.uk Electronics.website.
(Continued)

*Primary Examiner* — Daniel Chang
(74) *Attorney, Agent, or Firm* — Workman Nydegger

(57) ABSTRACT

A physical adapter receives a data stream comprising data usable to derive a rendition of a signal at a first level of quality and reconstruction data produced by processing a rendition of the signal at a second, higher level of quality and indicating how to reconstruct the rendition at the second level of quality using the rendition at the first level of quality. The physical adapter reconstructs the rendition at the second level of quality and outputs the reconstructed rendition and/or data derived from the reconstructed rendition. The physical adapter is connectable to signal processing equipment that outputs the data usable to derive the rendition at the first level of quality. The physical adapter increases the quality of the rendition of the signal relative to the first level of quality and enhances the functionality of the signal processing equipment.

13 Claims, 8 Drawing Sheets

(51) Int. Cl.
| | |
|---|---|
| *H04N 21/81* | (2011.01) |
| *H04N 21/418* | (2011.01) |
| *H04N 21/4408* | (2011.01) |
| *H04N 21/462* | (2011.01) |
| *H04N 19/31* | (2014.01) |
| *H04N 19/44* | (2014.01) |
| *H04N 19/625* | (2014.01) |
| *H04L 65/80* | (2022.01) |

(52) U.S. Cl.
CPC ....... *H04N 19/625* (2014.11); *H04N 21/4183* (2013.01); *H04N 21/4307* (2013.01); *H04N 21/4408* (2013.01); *H04N 21/4622* (2013.01); *H04N 21/816* (2013.01)

(58) Field of Classification Search
CPC ........... H04N 19/36; H04N 21/234327; H04N 19/34; H04N 19/187
See application file for complete search history.

(56) References Cited

U.S. PATENT DOCUMENTS

| | | | | |
|---|---|---|---|---|
| 7,308,099 | B1* | 12/2007 | Allamanche | H04K 1/00 348/E7.056 |
| 9,043,523 | B2 | 5/2015 | Sahdra et al. | |
| 2001/0009548 | A1* | 7/2001 | Morris | H04N 21/4344 370/392 |
| 2001/0033619 | A1* | 10/2001 | Hanamura | H04N 21/2343 375/240.26 |
| 2002/0015529 | A1* | 2/2002 | Kato | H04N 19/115 382/232 |
| 2003/0142744 | A1* | 7/2003 | Wu | G06T 9/00 375/240.03 |
| 2003/0202579 | A1* | 10/2003 | Lin | H04N 19/154 375/240.03 |
| 2003/0206558 | A1* | 11/2003 | Parkkinen | G10L 19/002 370/477 |
| 2005/0129123 | A1* | 6/2005 | Xu | H04N 19/149 375/240.16 |
| 2005/0175178 | A1* | 8/2005 | Candelore | H04N 21/4408 380/201 |
| 2005/0259729 | A1* | 11/2005 | Sun | H04N 19/33 375/240.1 |
| 2007/0028260 | A1* | 2/2007 | Williams | H04N 21/4433 725/31 |
| 2009/0141894 | A1* | 6/2009 | Sahdra | H04N 21/4622 380/239 |
| 2009/0187960 | A1* | 7/2009 | Lee | H04N 21/2362 725/131 |
| 2009/0225870 | A1* | 9/2009 | Narasimhan | H04N 19/30 375/240.26 |
| 2010/0088736 | A1 | 4/2010 | Besen | |
| 2010/0208830 | A1 | 8/2010 | Lowe et al. | |
| 2010/0260268 | A1* | 10/2010 | Cowan | H04N 19/597 375/240.25 |
| 2010/0272190 | A1* | 10/2010 | Kim | H04N 21/4382 375/240.26 |
| 2011/0150073 | A1* | 6/2011 | Luthra | H04N 21/440218 375/240.02 |
| 2011/0255607 | A1 | 10/2011 | Franke et al. | |
| 2013/0044183 | A1* | 2/2013 | Jeon | H04N 19/395 348/43 |
| 2013/0169866 | A1* | 7/2013 | Kim | H04N 21/4184 348/468 |
| 2013/0194384 | A1* | 8/2013 | Hannuksela | H04N 19/50 348/43 |
| 2013/0258195 | A1* | 10/2013 | Chung | H04N 21/4586 348/554 |
| 2013/0258204 | A1* | 10/2013 | Chung | H04N 21/818 348/719 |
| 2013/0263108 | A1* | 10/2013 | Chung | H04N 21/4184 717/170 |
| 2013/0343459 | A1* | 12/2013 | Bici | H04N 19/597 375/240.16 |
| 2014/0085415 | A1* | 3/2014 | Bici | H04N 19/597 348/43 |
| 2014/0086327 | A1* | 3/2014 | Ugur | H04N 19/52 375/240.16 |
| 2014/0161195 | A1* | 6/2014 | Karkkainen | H04N 19/94 375/240.25 |
| 2014/0173692 | A1* | 6/2014 | Srinivasan | H04W 12/02 726/4 |
| 2014/0218473 | A1* | 8/2014 | Hannuksela | H04N 19/176 348/43 |
| 2014/0301463 | A1* | 10/2014 | Rusanovskyy | H04N 19/39 375/240.14 |
| 2014/0321555 | A1 | 10/2014 | Rossato et al. | |
| 2014/0369407 | A1* | 12/2014 | Tanaka | H04N 19/18 375/240.03 |
| 2015/0103901 | A1* | 4/2015 | Sato | H04N 19/186 375/240.12 |
| 2015/0103926 | A1* | 4/2015 | Hannuksela | H04N 19/187 375/240.26 |
| 2015/0117524 | A1* | 4/2015 | Rondao Alface | H04N 19/46 375/240.08 |
| 2015/0156501 | A1* | 6/2015 | Hannuksela | H04N 19/70 375/240.12 |
| 2015/0358617 | A1* | 12/2015 | Sato | H04N 19/105 382/166 |

FOREIGN PATENT DOCUMENTS

| | | | | |
|---|---|---|---|---|
| WO | | 2014170819 A1 | 10/2014 | |
| WO | WO-2016071501 A1 * | | 5/2016 | ......... H04N 21/6587 |

OTHER PUBLICATIONS

Thor 4K Upscaler HDMI 2M HDMI Lead Richer Sounds.website.
Philips 4K Upscaling HDMI cable—Technicolor.website.
International Search Report and Written Opinion dated May 12, 2017 for PCT Application No. PCT/GB2017/050405.
Search Report dated Jul. 19, 2016 for GB Application No. GB1602820.1.
European Examination Report for EP 17711730.6 dated Sep. 27, 2019.

* cited by examiner

PHYSICAL ADAPTER, SIGNAL PROCESSING EQUIPMENT, METHODS AND COMPUTER PROGRAMS

CROSS-REFERENCE TO RELATED APPLICATIONS

This application is a continuation of International Application No. PCT/GB2017/050405, filed Feb. 16, 2017, which claims priority to GB Application No. 1602820.1, filed Feb. 17, 2016, under 35 U.S.C. § 119(a). Each of the above-referenced patent applications is incorporated by reference in its entirety.

BACKGROUND OF THE INVENTION

Field of the Invention

The present invention relates to a physical adapter, signal processing equipment, methods and computer programs.

Description of the Related Technology

There is an existing ecosystem of signal processing hardware that contains dedicated hardware chips configured to process certain types of signal. As new signal processing technologies are developed, new hardware chips may need to be developed to enable use of the new signal processing technologies. As a consequence, existing signal processing hardware with legacy hardware chips may be compatible with existing signal processing technologies but may not be compatible with the new signal processing technologies.

One known solution for facilitating adoption of new signal processing technologies is to replace the existing signal processing hardware with new signal processing hardware, the new signal processing hardware having new hardware chips that are compatible with the newer signal processing technology.

SUMMARY

According to a first aspect of the present invention, there is provided a physical adapter configured to:
receive at least one data stream comprising at least:
data usable to derive a rendition of a signal at a first level of quality in a tiered hierarchy including multiple levels of quality; and
reconstruction data produced by processing a rendition of the signal at a second, higher level of quality in the tiered hierarchy and indicating how to reconstruct the rendition of the signal at the second level of quality using the rendition of the signal at the first level of quality;
reconstruct the rendition of the signal at the second, higher level of quality based at least on the rendition of the signal at the first level of quality and the reconstruction data; and
output at least the reconstructed rendition of the signal and/or data derived from the reconstructed rendition of the signal,
wherein the physical adapter is configured to be connectable to signal processing equipment and, when connected to the signal processing equipment, to enhance the functionality of the signal processing equipment with additional functionality provided by the physical adapter, the signal processing equipment being configured to output the data usable to derive the rendition of the signal at the first level of quality and the physical adapter being configured to increase the quality of the rendition of the signal relative to the first level of quality.

According to a second aspect of the present invention, there is provided signal processing equipment configured to:
receive at least one data stream comprising at least:
data usable to derive a rendition of a signal at a first level of quality in a tiered hierarchy including multiple levels of quality; and
reconstruction data produced by processing a rendition of the signal at a second, higher level of quality in the tiered hierarchy and indicating how to reconstruct the rendition of the signal at the second level of quality using the rendition of the signal at the first level of quality;
extract the data usable to derive the rendition of the signal at the first level of quality and the reconstruction data from the at least one data stream;
output the data usable to derive the rendition of the signal at the first level of quality; and
output the reconstruction data,
wherein the signal processing equipment is configured to be connectable to a physical adapter, the physical adapter being configured to enhance, when connected to the signal processing equipment, the functionality of the signal processing equipment with additional functionality provided by the physical adapter, the signal processing equipment being configured to output the data usable to derive the rendition of the signal at the first level of quality and the physical adapter being configured to increase the quality of the rendition of the signal relative to the first level of quality.

According to a third aspect of the present invention, there is provided a method comprising, at a physical adapter:
receiving at least one data stream comprising at least:
data usable to derive a rendition of a signal at a first level of quality in a tiered hierarchy including multiple levels of quality; and
reconstruction data produced by processing a rendition of the signal at a second, higher level of quality in the tiered hierarchy and indicating how to reconstruct the rendition of the signal at the second level of quality using the rendition of the signal at the first level of quality;
reconstructing the rendition of the signal at the second, higher level of quality based at least on the rendition of the signal at the first level of quality and the reconstruction data; and
outputting at least the reconstructed rendition of the signal and/or data derived from the reconstructed rendition of the signal,
wherein the physical adapter is configured to be connectable to signal processing equipment and, when connected to the signal processing equipment, to enhance the functionality of the signal processing equipment with additional functionality provided by the physical adapter, the signal processing equipment being configured to output the data usable to derive the rendition of the signal at the first level of quality and the physical adapter being configured to increase the quality of the rendition of the signal relative to the first level of quality.

According to a fourth aspect of the present invention, there is provided a method comprising, at signal processing equipment:
receiving at least one data stream comprising at least:

data usable to derive a rendition of a signal at a first level of quality in a tiered hierarchy including multiple levels of quality; and reconstruction data produced by processing a rendition of the signal at a second, higher level of quality in the tiered hierarchy and indicating how to reconstruct the rendition of the signal at the second level of quality using the rendition of the signal at the first level of quality;

extracting the data usable to derive the rendition of the signal at the first level of quality and the reconstruction data from the at least one data stream;

outputting the data usable to derive the rendition of the signal at the first level of quality; and outputting the reconstruction data, wherein the signal processing equipment is configured to be connectable to a physical adapter, the physical adapter being configured to enhance, when connected to the signal processing equipment, the functionality of the signal processing equipment with additional functionality provided by the physical adapter, the signal processing equipment being configured to output the data usable to derive the rendition of the signal at the first level of quality and the physical adapter being configured to increase the quality of the rendition of the signal relative to the first level of quality.

According to a fifth aspect of the present invention, there is provided a computer program comprising instructions which, when executed, cause a physical adapter to perform a method comprising:

receiving at least one data stream comprising at least:

data usable to derive a rendition of a signal at a first level of quality in a tiered hierarchy including multiple levels of quality; and reconstruction data produced by processing a rendition of the signal at a second, higher level of quality in the tiered hierarchy and indicating how to reconstruct the rendition of the signal at the second level of quality using the rendition of the signal at the first level of quality;

reconstructing the rendition of the signal at the second, higher level of quality based at least on the rendition of the signal at the first level of quality and the reconstruction data; and outputting at least the reconstructed rendition of the signal and/or data derived from the reconstructed rendition of the signal, wherein the physical adapter is configured to be connectable to signal processing equipment and, when connected to the signal processing equipment, to enhance the functionality of the signal processing equipment with additional functionality provided by the physical adapter, the signal processing equipment being configured to output the data usable to derive the rendition of the signal at the first level of quality and the physical adapter being configured to increase the quality of the rendition of the signal relative to the first level of quality.

According to a sixth aspect of the present invention, there is provided a computer program comprising instructions which, when executed, cause signal processing equipment to perform a method comprising:

receiving at least one data stream comprising at least:

data usable to derive a rendition of a signal at a first level of quality in a tiered hierarchy including multiple levels of quality; and reconstruction data produced by processing a rendition of the signal at a second, higher level of quality in the tiered hierarchy and indicating how to reconstruct the rendition of the signal at the second level of quality using the rendition of the signal at the first level of quality;

extracting the data usable to derive the rendition of the signal at the first level of quality and the reconstruction data from the at least one data stream;

outputting the data usable to derive the rendition of the signal at the first level of quality; and outputting the reconstruction data, wherein the signal processing equipment is configured to be connectable to a physical adapter, the physical adapter being configured to enhance, when connected to the signal processing equipment, the functionality of the signal processing equipment with additional functionality provided by the physical adapter, the signal processing equipment being configured to output the data usable to derive the rendition of the signal at the first level of quality and the physical adapter being configured to increase the quality of the rendition of the signal relative to the first level of quality.

Further features and advantages will become apparent from the following description of embodiments, given by way of example only, which is made with reference to the accompanying drawings.

DETAILED DESCRIPTION OF CERTAIN INVENTIVE EMBODIMENTS

Figure 1:
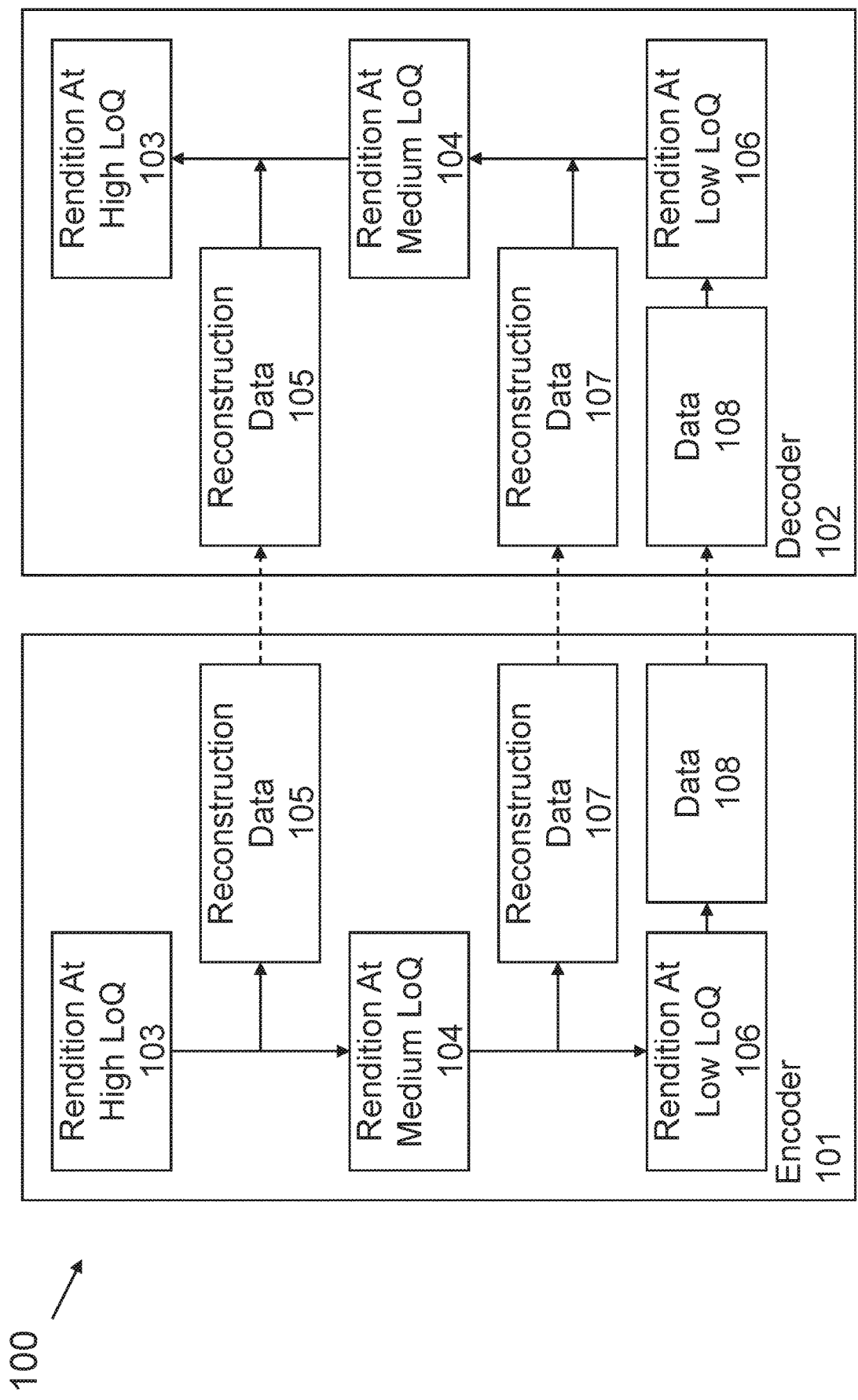
FIG. 1 shows a schematic block diagram of an example of a signal processing system.

Referring to FIG. 1, there is shown a schematic block diagram of an example of a signal processing system 100.

The signal processing system 100 can be used to process data that can be represented as a tiered hierarchy including multiple different levels of quality. The reader is referred to WO-A1-2014/170819, which describes in detail how data can be processed in such a tiered hierarchy and is hereby incorporated by reference.

The signal processing system 100 includes an encoder 101 and a decoder 102. The encoder 101 and decoder 102 may be embodied in hardware and/or software.

The encoder 101 receives a rendition of a signal at a relatively high level of quality 103 directly or indirectly from a source. The source could be, for example, an electronic apparatus which generates and/or records a signal using sensors. For example, in the case of a video signal, the electronic apparatus can be a video camera which records a scene at a specific relatively high level of quality (e.g., Ultra High Definition (UHD)) by using a number of sensors (e.g., charge-coupled devices (CCDs), complementary metal-oxide semiconductor (CMOS), etc.) to capture the information in the scene (for example, the intensity of the light at a particular position in the scene). In general, the level of quality at which the scene is recorded is proportional to the number of sensors used by the camera. The video signal could be further processed and/or stored (by the camera and/or different apparatuses) before being received by the encoder 101.

For convenience and brevity, in this example, the signal 103 is in the form of a video signal, it being understood that the signal 103 may be of a different type. For example, the signal 103 may be a sound signal, multichannel sound signal, picture, two-dimensional image, multi-view video signal, 3D video signal, volumetric signal, volumetric video signal, medical imaging signal or a signal with more than four dimensions.

The signal processing system 100 provides renditions of the video signal at multiple different levels of quality. In this example, the signal processing system 100 provides renditions of the video signal at three different levels of quality, it being understood that renditions of the video signal at a different number of levels of quality could be provided. In this specific example, the signal processing system 100 provides renditions of the video signal at relatively high, medium and relatively low levels of quality. In this specific example, the relatively high level of quality corresponds to UHD, the medium level of quality corresponds to High Definition (HD) and the relatively low level of quality corresponds to Standard Definition (SD). It is important to note that other configurations are possible. For example, the signal processing system 100 may provide renditions of the video signal at only two levels of quality; a relatively high level of quality and a relatively low level of quality. In such a case, the relatively level of quality may correspond to HD when the relatively low level of quality is SD, or it can correspond to UHD when the relatively low level of quality is HD. Alternatively, the signal processing system 100 may provide renditions of the video signal at more than three levels of quality. The embodiments described below apply mutatis mutandis to all such possible configurations.

One measure of the level of quality of a rendition of a video signal is its resolution. A higher resolution corresponds to a higher quality. The resolution may be spatial and/or temporal. Another measure of a level of quality of a rendition of a video signal is whether the rendition of the video signal is progressive or interlaced, with progressive corresponding to a higher quality than interlaced.

As described in detail in WO-A1-2014/170819, the encoder 101 processes the rendition of the video signal received directly or indirectly from a source at the relatively high level of quality 103 (e.g. UHD) to produce a rendition of the video signal at a medium level of quality 104 (e.g. HD) and to produce reconstruction data 105. The reconstruction data 105 indicates how to reconstruct the rendition of the video signal at the relatively high level of quality 103 (e.g. UHD) using the rendition of the video signal at the medium level of quality 104 (e.g. HD). Reconstruction of the video signal at the relatively high level of quality 103 (e.g. UHD) may involve using other data. For example, such reconstruction may involve using synchronisation data to synchronise the reconstruction data 105 with the rendition of the video signal at the medium level of quality 104 (e.g. HD).

Further, the encoder 101 may process the rendition of the video signal at the medium level of quality 104 (e.g. HD) to produce a rendition of the video signal at a relatively low level of quality 106 (e.g. SD) and to produce reconstruction data 107. The reconstruction data 107 indicates how to reconstruct the rendition of the video signal at the medium level of quality 104 (e.g. HD) using the rendition of the video signal at the relatively low level of quality 106 (e.g. SD). Reconstruction of the video signal at the medium level of quality 104 (e.g. HD) may involve using other data. For example, such reconstruction may involve using synchronisation data to synchronise the reconstruction data 107 with the rendition of the video signal at the relatively low level of quality 106 (e.g. SD). The process can then continue to produce further renditions at levels of quality lower than that of the rendition of the video signal at the relatively low level of quality 106 (e.g. SD) and to produce corresponding reconstruction data, each indicating how to reconstruct a rendition of the video signal at a higher level of quality using the rendition of the video signal at a lower level of quality.

The encoder 101 generates data 108 usable to derive the rendition of the video signal at the relatively low level of quality 106 (e.g. SD). The data 108 usable to derive the rendition of the video signal at the relatively low level of quality 106 (e.g. SD) may for example comprise an encoded version of the rendition of the video signal at the relatively low level of quality 106 (e.g. SD).

The encoder 101 transmits the data 108 usable to derive the rendition of the video signal at the relatively low level of quality 106 (e.g. SD) and the reconstruction data 105, 107 to the decoder 102. The encoder may transmit the data 108 usable to derive the rendition of the video signal at the relatively low level of quality 106 (e.g. SD) and the reconstruction data 105, 107 to the decoder 102 in one or more data streams.

In this example, the encoder 101 combines the data 108 usable to derive the rendition of the video signal at the relatively low level of quality 106 (e.g. SD) and the reconstruction data 105, 107 into a multiplexed data stream. In another example, the encoder 101 may send the data 108 usable to derive the rendition of the video signal at the relatively low level of quality 106 (e.g. SD) and the reconstruction data 105, 107 in separate, non-multiplexed data streams.

In this specific example, the multiplexed data stream is a Moving Pictures Expert Group (MPEG) transport stream (MPEG-TS).

MPEG-TS is a container format for transmission and storage of data including video, audio and other data. MPEG-TS is used in broadcast systems, such as Digital Video Broadcasting (DVB), Advanced Television Systems Committee (ATSC) and Internet Protocol Television (IPTV).

An MPEG-TS comprises multiple sub-streams known as elementary streams (ES), which are packetized and multiplexed together. An elementary stream can contain video data, audio data, or other data. For example, a video data stream can be encoded into an MPEG-2 encoded elementary stream. The MPEG-2 encoded elementary stream is then packetized into a packetized elementary stream (PES). To create the transport stream, the PESs are again packetized into transport packets, which are then multiplexed into the MPEG-TS.

Each elementary stream has an associated identifier, known as a packet identifier (PID). The PID comprises 13 bits. Each PID is unique within a particular MPEG-TS.

A program is associated with one or more elementary streams. For example, a program may be associated with a video elementary stream, an audio elementary stream and a data elementary stream. Each program is described by a Program Map Table (PMT), which also has its own PID and is transmitted in the MPEG-TS. Each elementary stream associated with a program has its PID listed in the PMT associated with that program.

For example, an MPEG-TS used in digital television may comprise three programs, each representing a different television channel. To decode a particular television channel, the receiver decodes the payloads of the packets having PIDs matching the PIDs in the PMT associated with the program corresponding to that channel. The receiver can discard the content of packets having other PIDs.

An elementary stream may be associated with multiple programs, by having its PID included in the PMTs associated with the multiple programs.

In this example, the encoder 101 produces a first elementary stream comprising the data 108 usable to derive the rendition of the video signal at the relatively low level of quality 106 (e.g. SD) and one or more further elementary streams comprising the reconstruction data 105, 107.

The decoder 102 uses the data 108 usable to derive the rendition of the video signal at the relatively low level of quality 106 (e.g. SD) to derive the rendition of the video signal at the relatively low level of quality 106 (e.g. SD). This may for example involve the decoder 102 decoding the received data 108 usable to derive the rendition of the video signal at the relatively low level of quality 106 (e.g. SD).

The decoder 102 uses the reconstruction data 107 and the rendition of the video signal at the relatively low level of quality 106 (e.g. SD) to reconstruct the rendition of the video signal at the medium level of quality 104 (e.g. HD). As such the rendition of the video signal at the relatively low level of quality 106 (e.g. SD) is used as a baseline for reconstructing the rendition of the video signal at the medium level of quality 104 (e.g. HD). Such reconstruction may involve using synchronisation data.

The decoder 102 uses the reconstruction data 105 and the rendition of the video signal at the medium level of quality 104 (e.g. HD) to reconstruct the rendition of the video signal at the relatively high level of quality 103 (e.g. UHD). As such the rendition of the video signal at the medium level of quality 104 (e.g. HD) is used as a baseline for reconstructing the rendition of the video signal at the relatively high level of quality 103 (e.g. UHD). Such reconstruction may involve using synchronisation data.

A first program may have a PMT listing the PID of the elementary stream comprising the data 108 usable to derive the rendition of the video signal at the relatively low level of quality 106 (e.g. SD), but not the at least one PID of the at least one elementary stream comprising the reconstruction data 105, 107. In this example, the first program is associated with the relatively low level of quality only (e.g. SD only). The decoder 102 seeking to decode the channel associated with the first program would decode the data 108 usable to derive the rendition of the video signal at the relatively low level of quality 106 (e.g. SD) but not the reconstruction data 105, 107. The decoder 102 would therefore be able to derive the rendition of the video signal at the relatively low level of quality 106 (e.g. SD) but would not be able to reconstruct the renditions of the video signal at the relatively high (e.g. UHD) or medium (e.g. HD) levels of quality 103, 104. This may allow for backwards compatibility with existing decoders, for example where the existing decoders are compatible with SD video data but are not compatible with HD or UHD video data.

A second program may have a PMT listing the PID of the elementary stream comprising the data 108 usable to derive the rendition of the video signal at the relatively low level of quality 106 (e.g. SD) and also at least one PID of at least one elementary stream comprising the reconstruction data 105, 107. In this example, the second program is associated with at least one of the relatively high (e.g. UHD) and medium (e.g. HD) levels of quality. The decoder 102 seeking to decode the channel associated with the second program would use the data 108 usable to derive the rendition of the video signal at the relatively low level of quality 106 (e.g. SD) and the reconstruction data 105, 107. The decoder 102 would therefore be able to reconstruct the rendition of the video signal at the relatively low level of quality 106 (e.g. SD) and would be able to reconstruct the rendition of the video signal at the medium level of quality 104 (e.g. HD) and, if the decoder 102 receives the reconstruction data 107, also at the relatively high level of quality 103 (e.g. UHD).

The encoder 101 may transmit some or all of the reconstruction data 105, 107 to the decoder 102. If the decoder 102 is not able to process the reconstruction data 105, 107 it receives, the decoder 102 may ignore any of the reconstruction data 105, 107 that it cannot process. In such an example, the decoder 102 may be able to derive the rendition of the video signal at the relatively low level of quality 106 (e.g. SD) from the data 108 usable to derive the rendition of the video signal at the relatively low level of quality 106 (e.g. SD), but may not be able to reconstruct the renditions of the video signal at the relatively high (e.g. UHD) and medium (e.g. HD) levels of quality 103, 104.

The encoder 101 may transmit all of the reconstruction data 105, 107 to a plurality of decoders 102. Those decoders 102 that are able to process the reconstruction data 105, 107 may do so, for example to reconstruct the renditions of the video signal at the relatively high (e.g. UHD) and medium (e.g. HD) levels of quality 103, 104. Those decoders 102 that cannot process the reconstruction data 105, 107 may ignore the reconstruction data 105, 107 and derive only the rendition of the video signal at the relatively low level of quality 106 (e.g. SD). This, again, can provide backwards compatibility when newer signal processing technologies are developed.

Obtaining the reconstruction data by processing a rendition of a signal at a given level of quality can comprise processing (e.g. downsampling) the rendition of the signal at the given level of quality to obtain a rendition of the signal at a lower level of quality and processing (e.g. upsampling) the rendition of the signal at the lower level of quality to obtain a further rendition of the signal at the given level of quality, the reconstruction data being indicative of the difference between the rendition of the signal at the given level of quality and the further rendition of the signal at the given level of quality resulting from such processing (e.g. downsampling and upsampling). The reconstruction data may be used to reconstruct the rendition of the signal at the given level of quality by processing (e.g. upsampling) the rendition of the signal at the lower level of quality to obtain the further rendition of the signal at the given level quality and then combining the reconstruction data with the further rendition of the signal at the given level of quality to obtain the rendition of the signal at the given level of quality.

Figure 2:
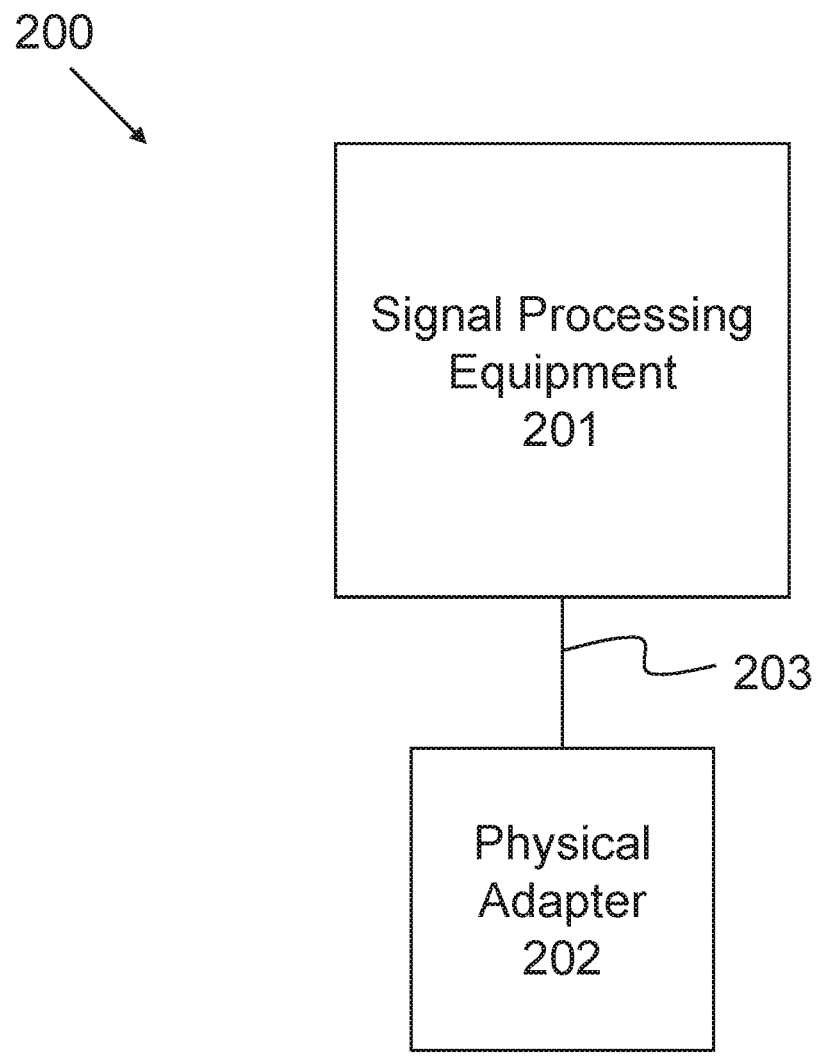
FIG. 2 shows a schematic block diagram of an example of a signal processing system in accordance with an embodiment of the present invention.

Referring to FIG. 2, there is shown a schematic block diagram of an example of a signal processing system 200.

The signal processing system 200 comprises signal processing equipment 201 and a physical adapter 202.

The physical adapter 202 has a relatively small form factor compared to that of the signal processing equipment 201. The physical adapter 202 is designed to perform at least one specific function in cooperation with the signal processing equipment 201. In this example, the signal processing equipment 201 is not able to perform the at least one specific function by itself. In other words, the signal processing equipment 201 can only perform the at least one specific function when it is communicatively coupled to the physical adapter 202.

The signal processing equipment 201 is communicatively coupled to the physical adapter 202 via at least one connection 203. As such, the physical adapter 202 is configured to be connectable to the signal processing equipment 203, via the at least one connection 203.

In an example, the physical adapter 202 is directly physically connected to the signal processing equipment 201. In another example, the physical adapter 202 is indirectly physically connected to the signal processing equipment 201. The physical adapter 202 may be indirectly physically connected to the signal processing equipment 201 via at least one cable. In another example, the physical adapter 202 is wirelessly connected to the signal processing equipment 201.

The signal processing equipment 201 is configured to transmit at least one data stream to the physical adapter 202 via the at least one connection 203. The physical adapter 202 is configured to receive the at least one data stream from the signal processing equipment 201 via the at least one connection 203.

The at least one data stream comprises data usable to derive a rendition of a signal at a first level of quality in a tiered hierarchy including multiple levels of quality. The at least one data stream also comprises reconstruction data. The reconstruction data indicates how to reconstruct a rendition of the signal at a second, higher level of quality in the tiered hierarchy. The at least one data stream may comprise other data. Examples of other data include, but are not limited to, audio data and/or synchronisation data.

The physical adapter 202 is configured to use the data usable to derive the rendition of the signal at the first level to derive the rendition of the signal at the first level of quality.

The physical adapter 202 is configured to reconstruct the rendition of the signal at the second, higher level of quality based on the rendition of the signal at the first level of quality and the reconstruction data. The physical adapter 202 may be configured to reconstruct the rendition of the signal at the second, higher level of quality based on additional data, such as synchronisation data.

The physical adapter 202 is configured to output the reconstructed rendition of the signal and/or data derived from the reconstructed rendition of the signal. The physical adapter 202 may be configured to output additional data, such as audio data. In an example, the physical adapter 202 is configured to output the reconstructed rendition of the signal and/or data derived from the reconstructed rendition of the signal to the signal processing equipment 201. In another example, the physical adapter 202 is configured to output the reconstructed rendition of the signal and/or data derived from the reconstructed rendition of the signal to further equipment (not shown), where the further equipment is different from the signal processing equipment 201.

As such, the signal processing equipment 201 is configured to output the data usable to derive the rendition of the signal at the first level of quality and the physical adapter 202 is configured to increase the quality of the rendition of the signal relative to that produced by the signal processing equipment 201.

By communicatively coupling the physical adapter 202 to the signal processing equipment 201 in this way, the signal processing equipment 201 does not need to be replaced by entirely new signal processing equipment, but is enhanced via the physical adapter 202. As result it may not be necessary to dispose of the signal processing equipment 201. This can have environmental benefits by reducing the amount of electrical waste. Further, the cost of providing the physical adapter 202 may be lower than providing an entirely new signal processing equipment. For example, at least some of the functionality of the existing signal processing equipment may still be compatible with the new signal processing technology and therefore does not need to be replaced.

Use of the physical adapter 202 may therefore allow the signal processing system 200 to perform operations where the signal processing equipment 201 is not capable of supporting such operations itself. For example, the signal processing equipment 201 may not have sufficient internal bandwidth to support such operations itself. In another example, it may not be possible, for technical or other purposes, to modify software in the video driver of the signal processing equipment 201 to allow the signal processing equipment 201 to support such operations itself. In yet another example, the signal processing equipment 201 may not have an output interface that would support output of the rendition of the signal at the second, higher level of quality; the physical adapter 201 may be used instead of, for example, updating an HDMI 1.4 output interface of the signal processing equipment 201 to an HDMI 2.0 output interface to support a higher data rate.

Figure 3:
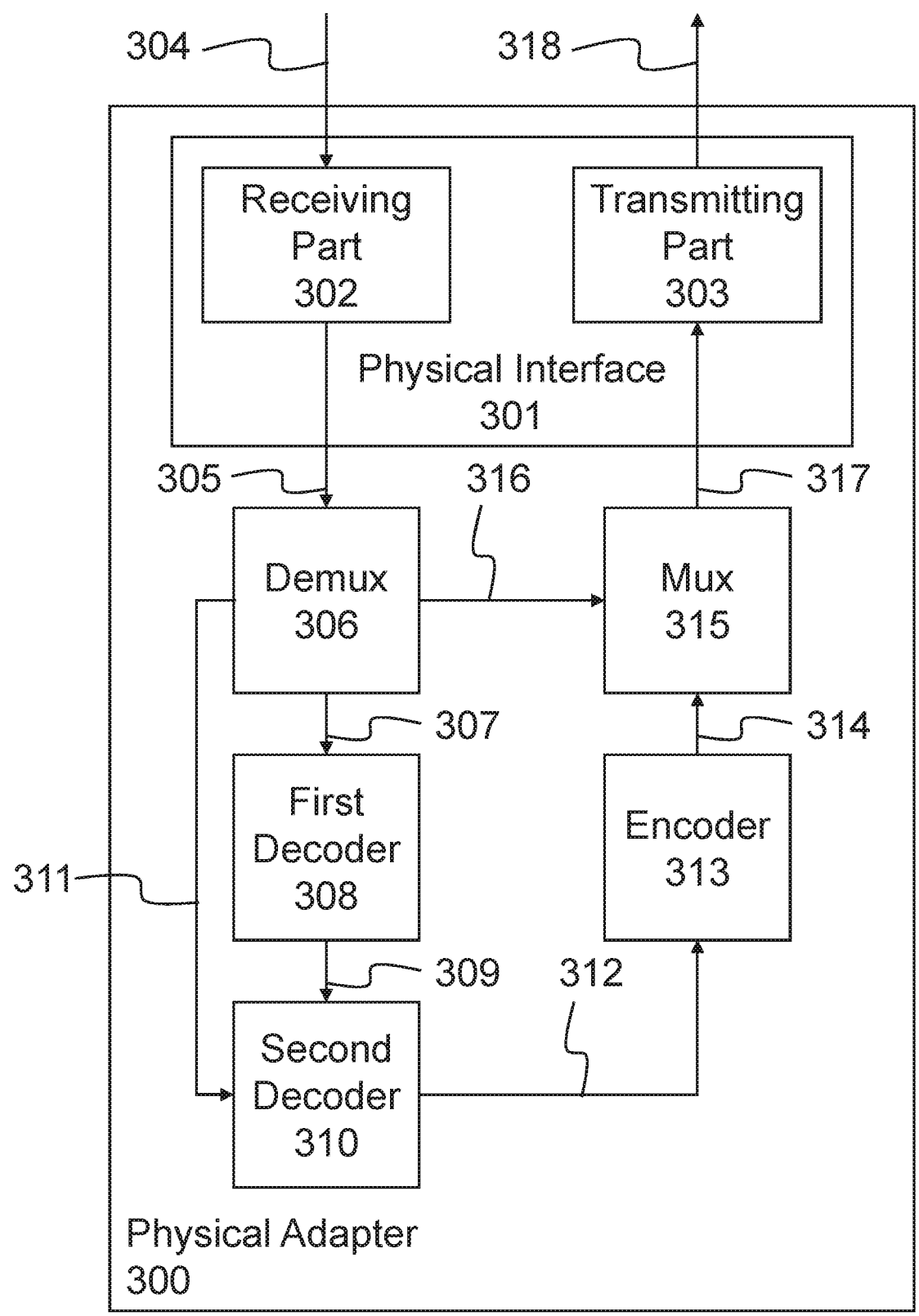
FIG. 3 shows a schematic block diagram of an example of a physical adapter in accordance with an embodiment of the present invention.

Referring to FIG. 3, there is shown a schematic block diagram of an example of a physical adapter 300.

For convenience and brevity, in this example the physical adapter 300 is a conditional-access module (CAM), it being understood that the physical adapter 300 may be of a different type.

A CAM is an electronic device that enables a host device to handle conditional access content. Conditional access concerns the protection of content by requiring certain conditions to be met before access to the content is allowed. Examples of host devices include, but are not limited to, televisions, for example integrated digital televisions, and set-top boxes (STBs).

A host device has at least one slot adapted to receive a CAM. A host device may have multiple slots to allow the host device to communicate with multiple CAMs. The one or more slots may be of a Personal Computer Memory Card International Association (PCMCIA) type. Where a CAM is connected to the host device, the host device passes a received signal to the CAM for processing and the CAM returns the processed signal to the host device.

A CAM may have a slot for a smart card and a smart card reader to read data from the smart card for authentication and decryption purposes. Authentication and decryption functionality may instead be embedded in memory in the CAM. The CAM is used to derive short-term decryption keys for the conditional access content. The smart card may, for example, allow access to pay-per-view content.

The host device is responsible for tuning to the appropriate channel or channels and demodulating the received signal. The CAM is used for descrambling the received signal. For example, the CAM may receive a scrambled transport stream, for example an MPEG-TS, from the host device via a Common Interface (CI), descramble the scrambled transport stream, and output the descrambled transport stream to the host device via the CI in a format that is usable by the host device.

The CAM 300 has a physical interface 301. The CAM 300 may be communicatively coupled to signal processing equipment via the physical interface 301. In this example, the physical interface 301 is a Digital Video Broadcast-Common Interface, DVB-CI.

The physical interface 301 has a receiving part 302 and a transmitting part 303. Although the receiving part 302 and the transmitting part 303 are shown as separate parts of the physical interface 301, it will be appreciated that the separation may be logical rather than physical.

The CAM 300 is configured to receive data 304 via the receiving part 302.

In this example, the data 304 is a multiplexed data stream. The multiplexed data stream 304 comprises data usable to derive the rendition of the signal at the first level of quality and reconstruction data. In this specific example, the multiplexed data stream is an MPEG-TS as described above.

The CAM 300 is therefore configured to receive the data usable to derive the rendition of the signal at the first level of quality and the reconstruction data via a common physical interface, physical interface 301, of the CAM 300. In other words, the data usable to derive the rendition of the signal at the first level of quality and the reconstruction data are both received via the same interface of the CAM 300, namely physical interface 301.

In this example, the receiving part 302 is configured to output data 305 to a demultiplexer 306.

In this example, the demultiplexer 306 is configured to extract three data streams from data 305. It will be appreciated however that the demultiplexer 306 could be configured to extract a different number of data streams from data 305. The demultiplexer 306 is configured to extract the data usable to derive the rendition of the signal at the first level of quality and the reconstruction data from the data 305 received from the receiving part 302. In the case of the MPEG-TS, the demultiplexer 306 may extract the data usable to derive the rendition of the signal at the first level of quality and the reconstruction data from the data 305 by identifying packets in the received MPEG-TS having PIDs associated with the elementary streams comprising the data usable to derive the rendition of the signal at the first level of quality and the reconstruction data.

The demultiplexer 306 is configured to output a first extracted data stream 307 to a first decoder 308. The first extracted data stream 307 comprises the data usable to derive the rendition of the signal at the first level of quality. In this example, the first extracted data stream 307 comprises encoded video data, for example MPEG-2 encoded video data. The demultiplexer 306 therefore receives and outputs the data usable to derive the rendition of the signal at the first level of quality in an encoded form.

The first decoder 308 is configured to decode the data usable to derive the rendition of the signal at the first level of quality and to output a first decoded data stream 309 to a second decoder 310. For example, the first decoder 308 uses an MPEG-2 codec to decode MPEG-2 encoded video data.

The demultiplexer 306 is also configured to output a second extracted data stream 311 to the second decoder 310. The second extracted data stream 311 comprises the reconstruction data.

The second decoder 310 is configured to process the first decoded data stream 309 and the second extracted data stream 311. The second decoder 310 is configured to derive the rendition of the signal at the first level of quality using the data usable to derive the rendition of the signal at the first level of quality comprised in the first decoded data stream 309. The second decoder 310 is also configured to use the derived rendition of the signal at the first level of quality and the reconstruction data to reconstruct the rendition of the signal at the second, higher level of quality.

The second decoder 310 is configured to output decoded data 312 to an encoder 313. The decoded data 312 comprises at least the rendition of the signal at the second, higher level of quality. In this example, the decoded data 312 does not comprise the reconstruction data, the reconstruction data having already been used by the second decoder 310 to reconstruct the rendition of the signal at the second, higher level of quality.

The encoder 313 is configured to encode the decoded data 312 and to output encoded data 314 to a multiplexer 315. As such the encoder 313 is configured to encode the rendition of the signal at the second, higher level of quality. The encoded data 314 is derived from the rendition of the signal at the second, higher level of quality. In this example, the encoder 313 is configured to encode data 312 using an MPEG-2 codec. In a specific example, the encoder 313 is configured to encode data 312 using MPEG-2 intra-frame coding only. In other words, in such a specific example, the encoder 313 does not use MPEG-2 inter-frame coding.

The demultiplexer 306 is also configured to extract and output a third extracted data stream 316 to the multiplexer 315. The third extracted data stream 316 comprises additional data. The additional data may comprise audio data. The demultiplexer 306 may extract the additional data by identifying packets in the received MPEG-TS having the PID with a elementary stream comprising the audio data.

The multiplexer 315 is configured to multiplex the encoded data 314 with the third extracted data stream 316 (which, in this example, is audio data) and to output multiplexed data 317 to the transmitting part 303 of the physical interface 301. The transmitting part 303 is configured to output data 318.

The CAM 300 is therefore configured to output the data derived from the reconstructed rendition of the signal at the second, higher level of quality via the same (or 'common') physical interface via which the data 304 is received, namely the physical interface 301.

In this example, the CAM 300 is configured to output the data derived from the reconstructed rendition of the signal at the second, higher level of quality to the same signal processing equipment from which the data 304 is received. However, a physical adapter 300 may be configured to output the data derived from the reconstructed rendition of the signal at the second, higher level of quality to a different signal processing equipment than the one from which the data 304 is received.

In this example, the CAM 300 is configured to be powered by signal processing equipment. The CAM 300 may be configured to be powered via the common physical interface 301.

In this example, the CAM 300 performs the function of a transcoder plugin.

In an example, the CAM 300 receives an MPEG-2 encoded transport stream and outputs an MPEG-2 encoded data stream. The output MPEG-2 encoded data stream comprises video data at a higher level of quality than the video data in the received MPEG-2 encoded transport stream. The level of quality is increased using the reconstruction data. As such, the CAM 300 processes the received data, increases the quality of the video data within it and outputs data as if the higher quality video data had been in the initially received data. This reconstruction process is, in effect, transparent to the signal processing equipment with which the CAM 300 communicates. From the perspective of the signal processing equipment, it is as if the CAM 300 had initially received the higher quality video.

Figure 4:
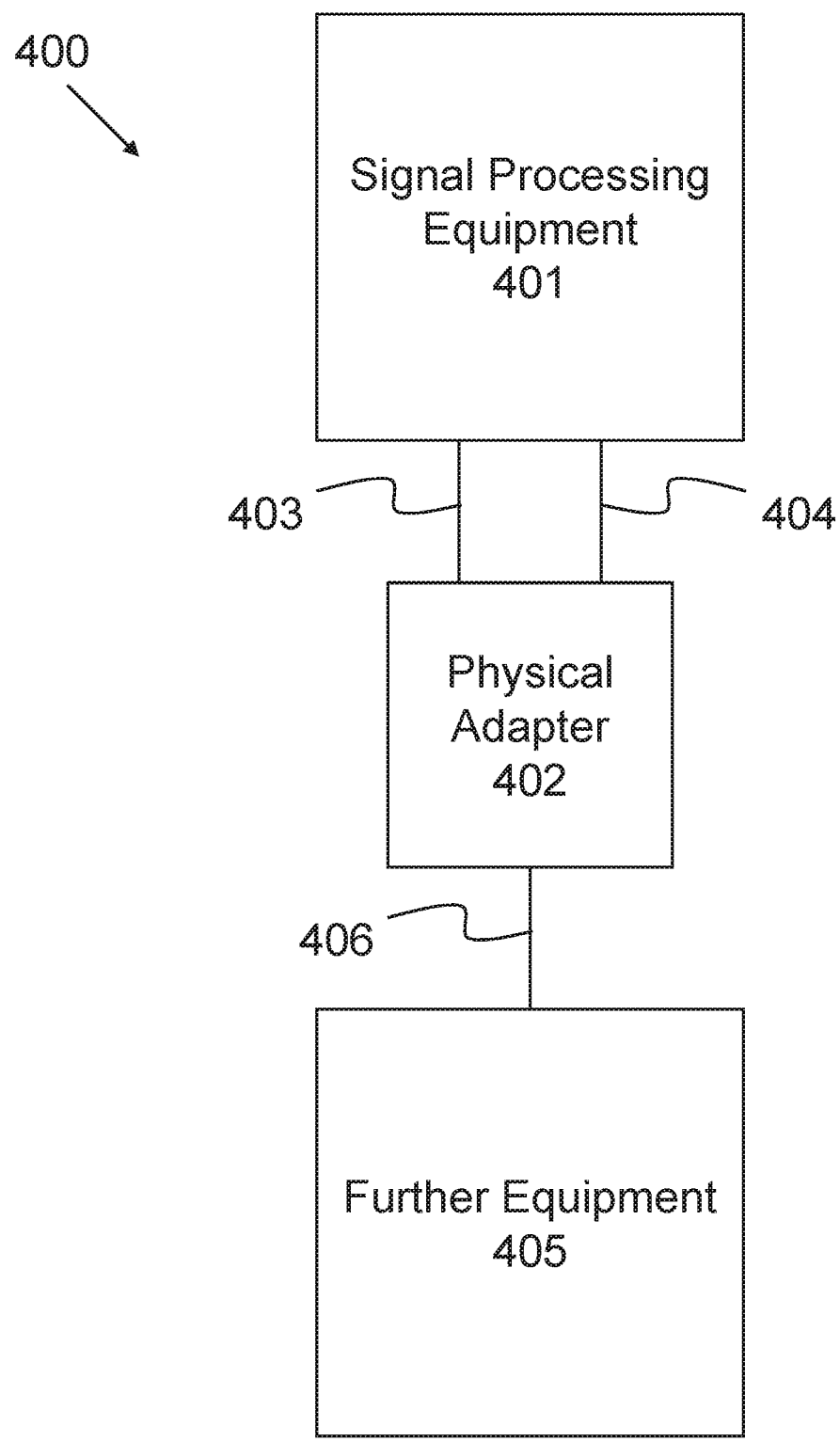
FIG. 4 shows a schematic block diagram of an example of a signal processing system in accordance with an embodiment of the present invention.

Referring to FIG. 4, there is shown a schematic block diagram of an example of a signal processing system 400.

The signal processing system 400 is similar to the signal processing system 200 described above in that it includes signal processing equipment 401 and a physical adapter 402 configured to be connectable to the signal processing equipment 401. In this example, the physical adapter 402 is communicatively coupled to the signal processing equipment 401 via a first connection 403 and a second connection 404. The physical adapter 402 is communicatively coupled to further equipment 405 via a third connection 406.

For convenience and brevity, in this example the signal processing equipment 401 is an HD STB, it being understood that the signal processing equipment 401 may be of a different type. For example, the signal processing equipment 401 may be a different type of STB or a different type of signal processing equipment 401 altogether.

In this example, the HD STB 401 is capable of deriving a rendition of a video signal at a first level of quality (e.g. HD), but is not capable itself of reconstructing a rendition of the video signal at the second, higher level of quality (e.g. UHD). The HD STB 401 is provided with additional (or 'enhanced') functionality by communicatively coupling the physical adapter 402 to it. The physical adapter 402 is configured to reconstruct the rendition of the video signal at the second, higher level of quality (e.g. UHD).

For convenience and brevity, in this example the physical adapter 402 is an HDMI dongle, it being understood that the physical adapter 402 may be of a different type. For example, the physical adapter 402 may be a different type of dongle (for example one that does not use HDMI) or a different type of physical adapter altogether.

A dongle is a device that is configured to be communicatively coupled to another device to provide that device with additional functionality. A dongle may have a relatively small form factor compared to the form factor of the device to which it is communicatively coupled. The device to which the dongle is attached only has the additional functionality when the dongle is communicatively coupled to it. The dongle may be communicatively coupled via a direct physical connection, an indirect physical connection and/or a wireless connection.

The HDMI dongle 402 is configured to increase the quality of the rendition of the video signal to a higher level of quality (e.g. UHD) than the level of quality the HD STB 401 is capable of deriving (e.g. HD).

In this example, the HD STB 401 is configured to derive the rendition of the video signal at the first level of quality (e.g. HD) using an HD base codec. The HD STB 401 is configured to provide the decoded rendition of the video signal at the first level of quality (e.g. HD) to the HDMI dongle 402 over the first connection 403. In this example, the first connection 403 is an HDMI connection. In this specific example, the HDMI connection 403 is an HDMI 1.4 connection. In this example, the HDMI 1.4 connection has sufficient capacity to be able to support transmission of the decoded rendition of the video signal at the first level of quality (e.g. HD) to the HDMI dongle 402. However, in this example, the HDMI 1.4 connection does not have sufficient capacity to be able to carry the rendition of the video signal at the second, higher level of quality (e.g. UHD) to the HDMI dongle 402.

The HD STB 401 is configured to extract reconstruction data from the received data and to provide the reconstruction data to the HDMI dongle 402 over the second connection 404. In this example, the second connection 404 is a USB connection.

The HDMI dongle 402 receives the decoded rendition of the video signal at the first level of quality (e.g. HD) over the HDMI connection 403 and receives the reconstruction data over the USB connection 404. The HDMI dongle 402 synchronises the received rendition of the video signal at the first level of quality (e.g. HD) and the received reconstruction data and reconstructs the rendition of the video signal at the second, higher level of quality (e.g. UHD) using the rendition of the video signal at the first level of quality (e.g. HD) and the reconstruction data.

The HDMI dongle 402 outputs the rendition of the video signal at the second, higher level of quality (e.g. UHD) to the further equipment 405 over the third connection 406. In this example, the further equipment 405 comprises a display device capable of displaying the rendition of the video signal at the second, higher level of quality (e.g. UHD). In this example, the third connection 406 is an HDMI connection. More specifically, in this example, the HDMI connection 406 is an HDMI 2.0 connection. In this example, the HDMI 2.0 has sufficient capacity to be able to support transmission of the rendition of the video signal at the second, higher level of quality (e.g. UHD) to the further equipment 405.

The further equipment 405 then processes the rendition of the video signal at the second, higher level of quality (e.g. UHD) received over the third connection 406. For example, the further equipment 405 may cause the rendition of the video signal at the second, higher level of quality (e.g. UHD) to be displayed.

It will be appreciated that although, in this example, the HD STB 401 is capable of decoding HD video data, it is not capable of decoding video data at a higher level of quality. The HDMI dongle 402 enhances the functionality of the HD STB 401 by allowing the HD STB 401 to provide video data at the higher level of quality, using the HDMI dongle 402.

Figure 5:
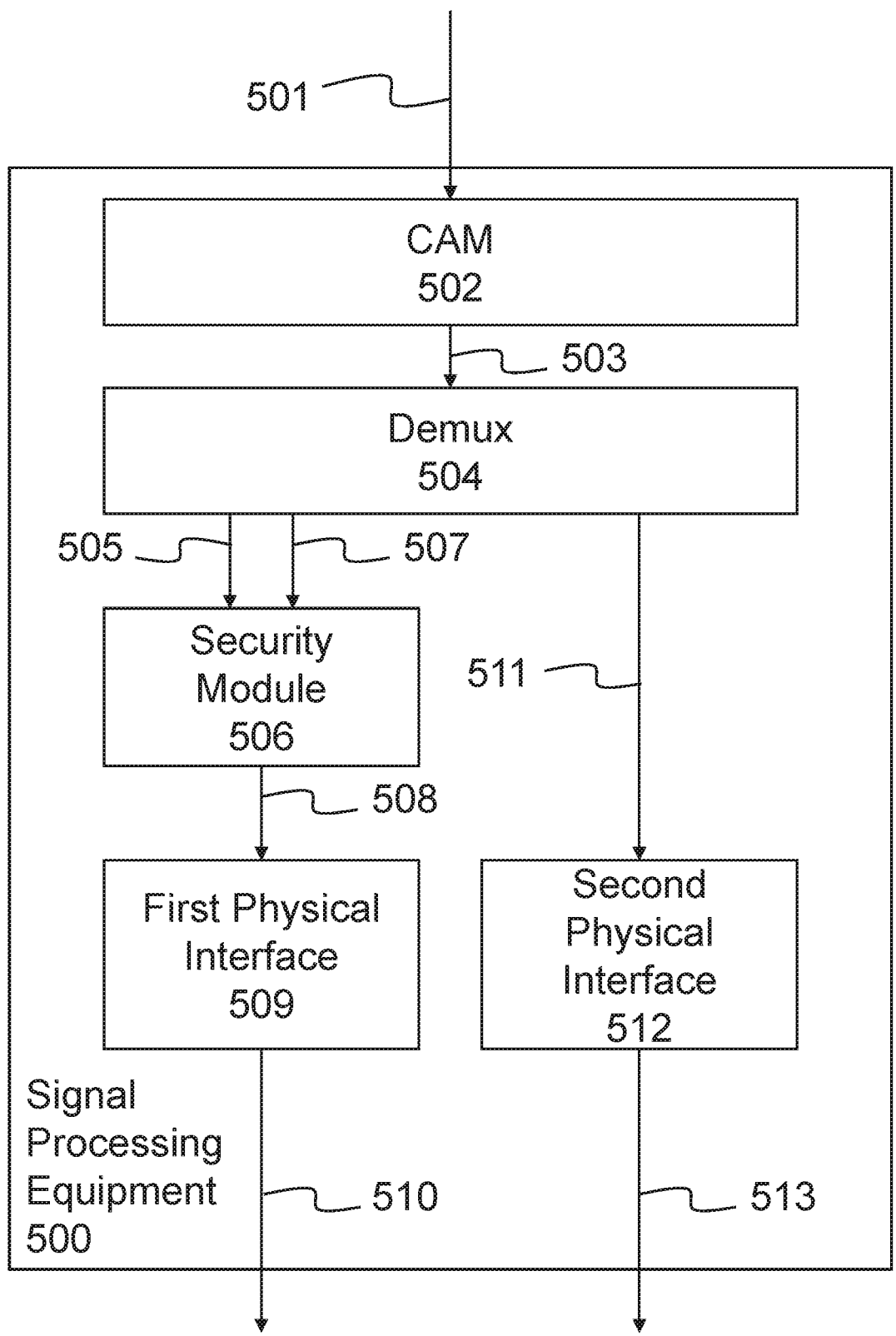
FIG. 5 shows a schematic block diagram of an example of signal processing equipment in accordance with an embodiment of the present invention.

Referring to FIG. 5, there is shown a schematic block diagram of an example of signal processing equipment 500.

For convenience and brevity, in this example the signal processing equipment 500 is an STB, it being understood that the signal processing equipment 500 may be of a different type.

The STB 500 is configured to receive data 501. The data 501 comprises at least one data stream. The at least one data stream comprises data usable to derive a rendition of a signal at a first level of quality in a tiered hierarchy including multiple levels of quality. The at least one data stream also comprises reconstruction data indicating how to reconstruct a rendition of the signal at a second, higher level of quality in the tiered hierarchy.

In this example, the signal processing equipment 500 is configured to receive the data usable to derive the rendition of the signal at the first level of quality and the reconstruction data in a multiplexed data stream. The multiplexed data stream may be a broadcast multiplexed data stream. In this example, the multiplexed data stream is an MPEG-TS as described above. In this example, the first level of quality is HD and the reconstruction data is UHD reconstruction data to allow reconstruction of the rendition of the video signal at the second, higher UHD level of quality.

In this example, signal processing equipment 500 has a CAM 502 that receives and processes the data 501. In this example, the CAM 502 is a conventional CAM that descrambles received data but does not increase the level of quality of the received data in the manner described above in relation to CAM 300. The CAM 502 is configured to output data 503 to a demultiplexer 504. The data 503 output by the CAM 502 comprises the data usable to derive the rendition of the signal at the first level of quality (e.g. HD) and also comprises the reconstruction data.

In this example, demultiplexer 504 is configured to extract three data streams from the data 503 received from the CAM 502.

The demultiplexer 504 is configured to extract and output a first extracted data stream 505 to a security module 506 of the signal processing equipment 500. The first extracted data stream 505 comprises the data usable to derive the rendition of the video signal at the first level of quality (e.g. HD).

The demultiplexer 504 is also configured to output a second extracted data stream 507 to the security module 506 of the signal processing equipment 500. The second extracted data stream 507 comprises additional data associated with the video signal. In this example, the additional data is audio data.

The security module 506 is configured to process the first extracted data stream 505 and the second extracted data stream 507 and to output data 508 to a first physical interface 509 of the signal processing equipment 500.

In this example, the first physical interface 509 is a High-Definition Multimedia Interface, HDMI. The security module 506 is configured to encrypt at least the data usable to derive the rendition of the signal at the first level of quality (e.g. HD). The output data 508 is therefore encrypted data. In this example, the security module 506 is configured to use High-bandwidth Digital Content Protection, HDCP, to encrypt at least the data usable to derive the rendition of the signal at the first level of quality (e.g. HD).

The first physical interface 509 is configured to output data 510.

The demultiplexer 504 is configured to extract and output a third extracted data stream 511 to a second physical interface 512 of the signal processing equipment 500. The third extracted data stream 511 comprises the reconstruction data. The second physical interface 512 is different from the first physical interface 509. In this example, the second physical interface 512 is a Universal Serial Bus, USB, interface.

The second physical interface 512 is configured to output data 513.

The signal processing equipment 500 is configured to output data 510 and data 513 to a physical adapter. The physical adapter may, for example, be in the form of a dongle.

As such, the signal processing equipment 500 is configured to be connectable to a physical adapter. The signal processing equipment 500 is configured to output the data usable to derive the rendition of the signal at the first level of quality (e.g. HD) and the physical adapter is configured to increase the quality of the rendition of the signal relative to the first level of quality (e.g. from HD to UHD).

In this example, the signal processing equipment 500 is configured to transmit synchronisation data via the first physical interface 509. The synchronisation data is to be used by the physical adapter to reconstruct the rendition of the signal at the second, higher level of quality (e.g. UHD).

In an example, the synchronisation data is comprised in a presentation timestamp (PTS). PTS is a timestamp metadata field in an MPEG transport stream that is used to achieve synchronisation of the different elementary streams of a program.

In another example, the signal processing equipment 500 is configured to transmit the synchronisation data as PTS in blanking periods of HDMI frames. For example, the PTS may be transmitted as island packets in horizontal blanking periods of the HDMI transmission.

In another example, the signal processing equipment 500 is configured to transmit the synchronisation data as PTS in a private audio stream.

In another example, the signal processing equipment 500 is configured to transmit the synchronisation data as PTS by placing it in a Chroma plane. For example, the PTS may be placed in the top right corner of the Chroma plane so that it is unlikely to be noticed by the user.

The signal processing equipment 500 is configured to provide power to the physical adapter. In this example, the signal processing equipment 500 is configured to provide power to the physical adapter via the second physical interface 512.

In an example, the signal processing equipment 500 is modified to be able to operate in the manner described above with reference to FIG. 5. For example, signal processing equipment may initially be configured to such that the reconstruction data would not be output via the second physical interface 512. Such modification may be made via a software update to the signal processing equipment 500 in order to have the reconstruction data output via the second physical interface 512. The software update may for example be made via an over-the-air (OTA) update. Alternatively the software may be updated manually, for example by a user downloading the updated software onto the signal processing equipment 500 (for example using a memory stick) and then installing the updated software.

Figure 6:
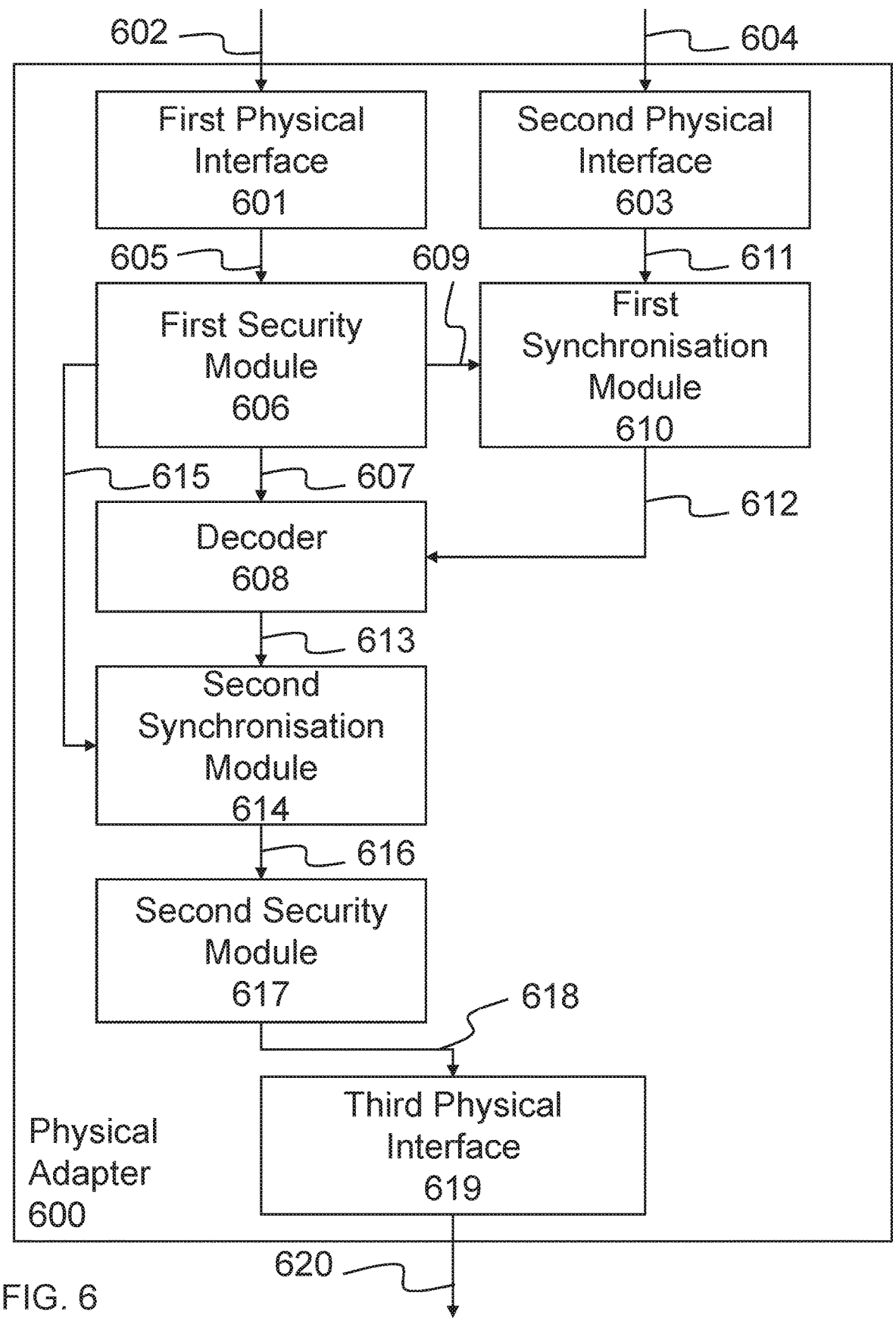
FIG. 6 shows a schematic block diagram of an example of a physical adapter in accordance with an embodiment of the present invention.

Referring to FIG. 6, there is shown a schematic block diagram of an example of a physical adapter 600.

For convenience and brevity, in this example the physical adapter 600 is an HDMI dongle, it being understood that the physical adapter 600 may be of a different type.

The HDMI dongle 600 has a first physical interface 601. The HDMI dongle 600 may be communicatively coupled to signal processing equipment 401, 500 via the first physical interface 601. The HDMI dongle 600 is configured to receive first data 602 via the first physical interface 601. In this example, the first physical interface 601 is an HDMI. In this specific example, the first physical interface 601 is an HDMI 2.0. In this example, the first data 602 comprises data usable to derive the rendition of the signal at the first level of quality (e.g. HD).

In this example, the first data 602 also comprises synchronisation data. The synchronisation data is to be used by the HDMI dongle 600 to reconstruct the rendition of the signal at the second, higher level of quality (e.g. HD). As such, the HDMI dongle 600 is configured to receive the synchronisation data via the first physical interface 601. In this example, the synchronisation data is received from the signal processing equipment 401, 500.

The HDMI dongle 600 has a second physical interface 603. The HDMI dongle 600 may be communicatively coupled to signal processing equipment 401, 500 via the second physical interface 603. The HDMI dongle 600 is configured to receive second data 604 via the second physical interface 603. In this example, the second physical interface is a USB interface.

As such, the HDMI dongle 600 is configured to receive the data usable to derive the rendition of the signal at the first level of quality (e.g. HD) via the first physical interface 601 and to receive the reconstruction data via the second, different physical interface 603.

The first physical interface 601 is configured to output data 605 to a first security module 606. In this example, the data 605 comprises the data usable to derive the rendition of the signal at the first level of quality (e.g. HD).

The first security module 606 is configured to process the data 605 received from the first physical interface 601. In this example, processing of the data 605 by the first security module 606 comprises decrypting the data usable to derive the rendition of the signal at the first level of quality (e.g. HD). In this example, the first security module 606 is configured to use HDCP to decrypt the data usable to derive the rendition of the signal at the first level of quality (e.g. HD).

In this example, processing of the data 605 by the first security module 606 also includes extracting a plurality of data streams from the data 605.

In this example, the first security module 606 is configured to extract and output a first extracted data stream 607 to a decoder 608.

The first security module 606 is also configured to extract and output a second extracted data stream 609 to a first synchronisation module 610.

The first synchronisation module 610 is configured to receive output data 611 from the second physical interface 603. In this example, the data 611 received from the second physical interface 603 comprises the reconstruction data.

The first synchronisation module 610 is configured to process the second extracted data stream 609 received from the security module 606 and the output data 611 received from the second physical interface 603 and to output data 612 to the decoder 608.

The decoder 608 is configured to process the first extracted data stream 607 received from the first security module 606 and the data 612 received from the first synchronisation module 610 and to output decoded data 613 to a second synchronisation module 614.

The first security module 606 is also configured to extract and output a third extracted data stream 615 to the second synchronisation module 614. The third extracted data stream 615 comprises additional data. In this example, the additional data comprises audio data.

The second synchronisation module 614 is configured to process the decoded data 613 received from the decoder 608 and the third extracted data stream 615 received from the first security module 606 and to output data 616 to a second security module 617.

The second security module 617 is configured to process the data 616 received from the second synchronisation module 614 and to output data 618 to a third physical interface 619 of the HDMI dongle 600.

In this example, the processing of the data 616 by the second security module 617 comprises encrypting the reconstructed rendition of the signal at the second, higher level of quality (e.g. UHD) and/or encrypting data derived from the reconstructed rendition of the signal at the second, higher level of quality (e.g. UHD). In this example, the second security module 617 is configured to use HDCP to encrypt the reconstructed rendition of the signal at the second, higher level of quality (e.g. UHD) and/or encrypt the data derived from the reconstructed rendition of the signal at the second, higher level of quality (e.g. UHD).

The third physical interface 619 of the HDMI dongle 600 is different from the first physical interface 601 of the HDMI dongle 600. The third physical interface 619 of the physical adapter 600 is also different from the second physical interface 603 of the HDMI dongle 600. In this example, the third physical interface 619 is a HDMI. More specifically, in this example, the third physical interface 619 is a HDMI 2.0.

The third physical interface 619 of the HDMI dongle 600 is configured to output data 620.

As such, the HDMI dongle 600 is configured to output the reconstructed rendition of the signal at the second, higher level of quality (e.g. UHD) and/or the data derived from the reconstructed rendition of the signal at the second, higher level of quality (e.g. UHD) via the third physical interface 619.

In this example, the third physical interface 619 is configured to output the data 620 to further equipment. In an example, the further equipment is a television.

In this example, the HDMI dongle 600 is configured to be powered by signal processing equipment 401, 500. For example, the HDMI dongle 600 may be configured to be powered via the second physical interface 603. In another example, the HDMI dongle 600 may be powered in a different way. For example, the HDMI dongle 600 may be powered by an internal battery.

Figure 7:
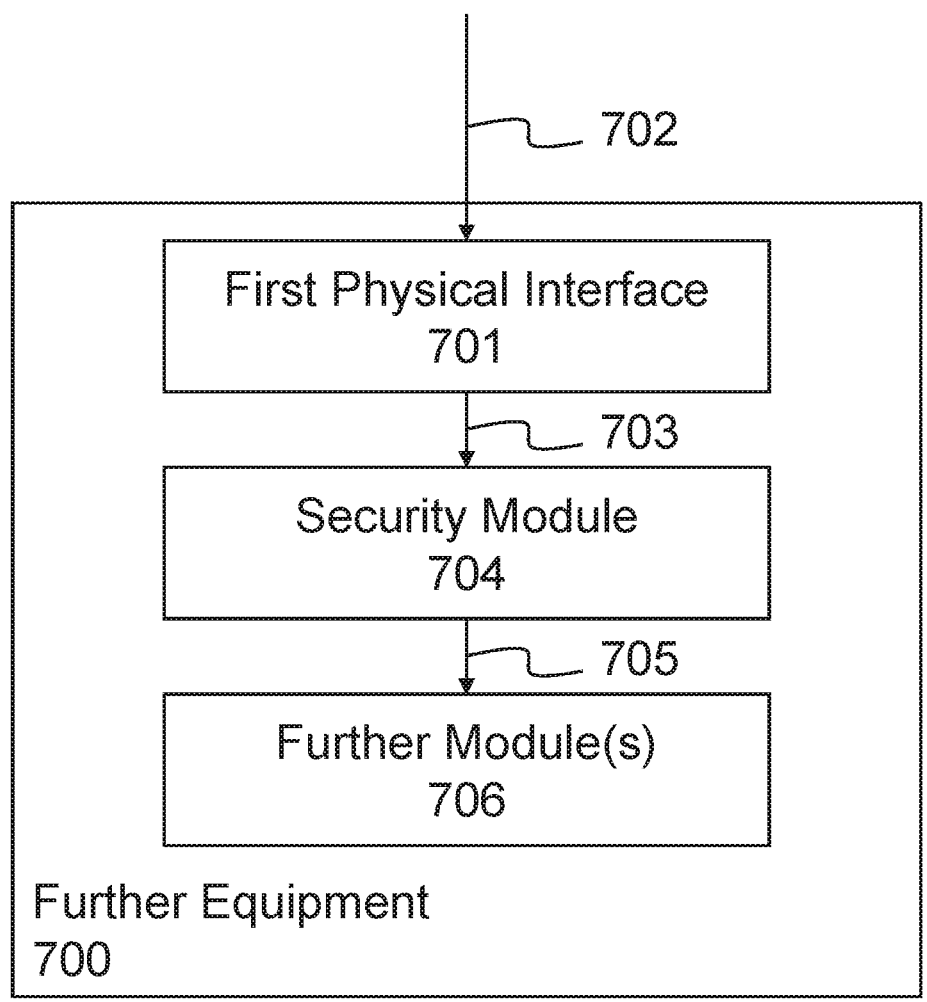
FIG. 7 shows a schematic block diagram of an example of further equipment in accordance with an embodiment of the present invention.

Referring to FIG. 7, there is shown a schematic block diagram of an example of further equipment 700.

For convenience and brevity, in this example the further equipment 700 is a television, it being understood that the further equipment 700 may be of a different type.

The television 700 has a first physical interface 701. The television 700 may be communicatively coupled to a physical adapter, for example physical adapter 600, via the first physical interface 701. The television 700 is configured to receive first data 702 via the first physical interface 701. The first physical interface 701 is configured to output data 703 to a security module 704.

The security module 704 is configured to process the data 703 received from the first physical interface 701. In this example, processing of the data 703 by the security module 704 comprises decrypting the data 703. In this example, the security module 704 is configured to use HDCP to decrypt the data 703.

The security module 704 is configured to output data 705 to at least one further module 706 in the television 700. This may, for example, involve displaying the decrypted received data.

Figure 8:
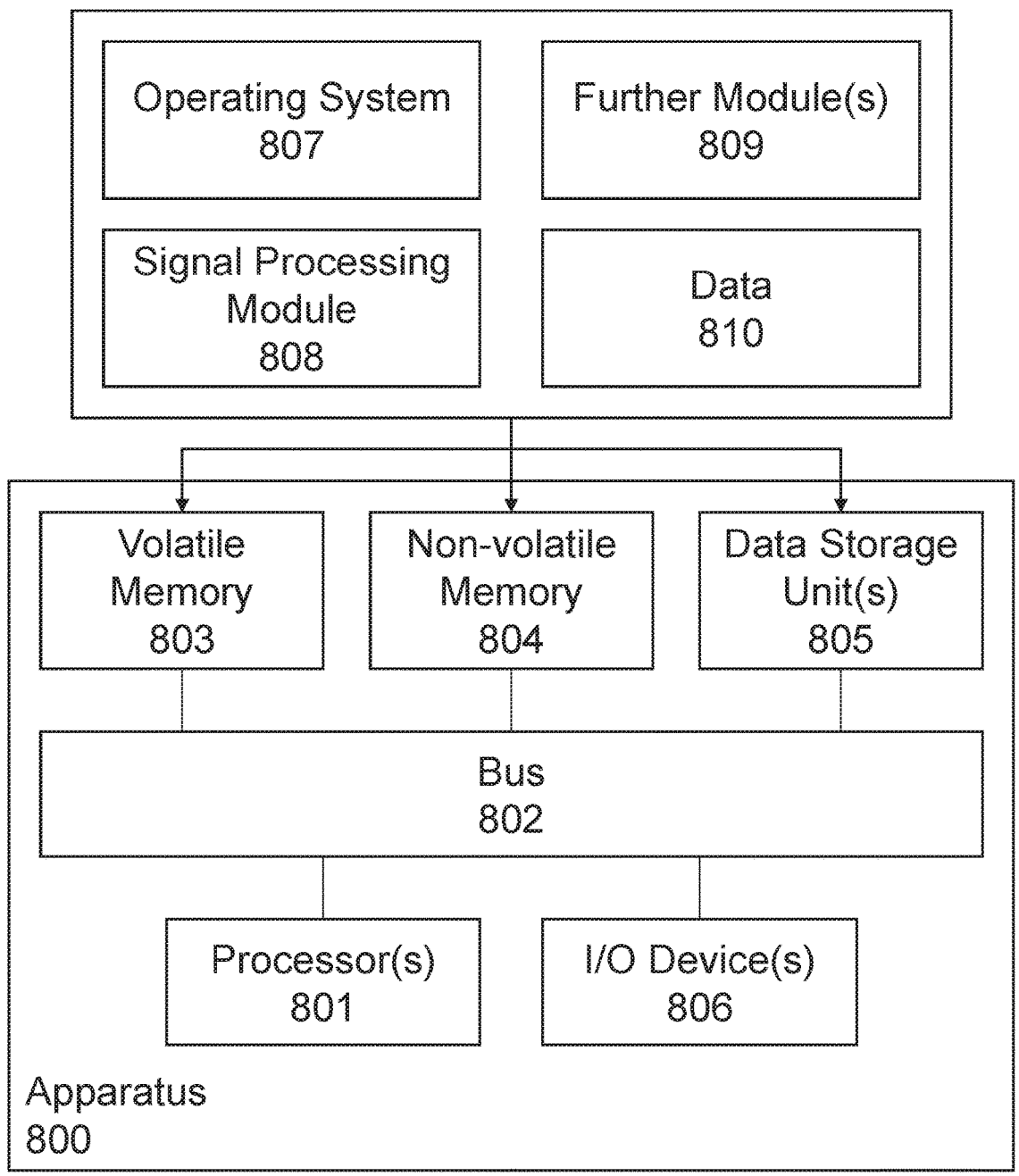
FIG. 8 shows a schematic block diagram of an example of an apparatus in accordance with an embodiment of the present invention.

Referring to FIG. 8, there is shown a schematic block diagram of an example of an apparatus 800.

In an example, the apparatus 800 is signal processing equipment. Examples of signal processing equipment include, but are not limited to, an STB or television. In another example, the apparatus 800 is a physical adapter. Examples of physical adapter include, but are not limited to, a CAM or a dongle.

Other examples of apparatus 800 include, but are not limited to, a mobile computer, a personal computer system, a wireless device, base station, phone device, desktop computer, laptop, notebook, netbook computer, mainframe computer system, handheld computer, workstation, network computer, application server, storage device, a consumer electronics device such as a camera, camcorder, mobile device, video game console, handheld video game device, a peripheral device such as a switch, modem, router, etc., or in general any type of computing or electronic device.

In this example, the apparatus 800 comprises one or more processors 801 configured to process information and/or instructions. The one or more processors 801 may comprise a central processing unit (CPU). The one or more processors 801 are coupled with a bus 802. Operations performed by the one or more processors 801 may be carried out by hardware and/or software. The one or more processors 801 may comprise multiple co-located processors or multiple disparately located processors.

In this example, the apparatus 800 comprises computer-usable volatile memory 803 configured to store information and/or instructions for the one or more processors 801. The computer-usable volatile memory 803 is coupled with the bus 802. The computer-usable volatile memory 803 may comprise random access memory (RAM).

In this example, the apparatus 800 comprises computer-usable non-volatile memory 804 configured to store information and/or instructions for the one or more processors 801. The computer-usable non-volatile memory 804 is coupled with the bus 802. The computer-usable non-volatile memory 804 may comprise read-only memory (ROM).

In this example, the apparatus 800 comprises one or more data-storage units 805 configured to store information and/or instructions. The one or more data-storage units 805 are coupled with the bus 802. The one or more data-storage units 805 may for example comprise a magnetic or optical disk and disk drive or a solid-state drive (SSD).

In this example, the apparatus 800 comprises one or more input/output (I/O) devices 806 configured to communicate information to and/or from the one or more processors 801. The one or more I/O devices 806 are coupled with the bus 802. The one or more I/O devices 806 may comprise at least one network interface. The at least one network interface may enable the apparatus 800 to communicate via one or more data communications networks. Examples of data communications networks include, but are not limited to, the Internet and a Local Area Network (LAN). The one or more I/O devices 806 may enable a user to provide input to the apparatus 800 via one or more input devices (not shown). The one or more input devices may include for example a remote control, one or more physical buttons etc. The one or more I/O devices 806 may enable information to be provided to a user via one or more output devices (not shown). The one or more output devices may for example include a display screen.

Various other entities are depicted for the apparatus 800. For example, when present, an operating system 807, signal processing module 808, one or more further modules 809, and data 810 are shown as residing in one, or a combination, of the computer-usable volatile memory 803, computer-usable non-volatile memory 804 and the one or more data-storage units 805. The signal processing module 808 may be implemented by way of computer program code stored in memory locations within the computer-usable non-volatile memory 804, computer-readable storage media within the one or more data-storage units 805 and/or other tangible computer-readable storage media. Examples of tangible computer-readable storage media include, but are not limited to, an optical medium (e.g., CD-ROM, DVD-ROM or Blu-ray), flash memory card, floppy or hard disk or any other medium capable of storing computer-readable instructions such as firmware or microcode in at least one ROM or RAM or Programmable ROM (PROM) chips or as an Application Specific Integrated Circuit (ASIC).

The apparatus 800 may therefore comprise a signal processing module 808 which can be executed by the one or more processors 801. The signal processing module 808 can be configured to include instructions to implement at least some of the operations described herein. During operation, the one or more processors 801 launch, run, execute, interpret or otherwise perform the instructions in the signal processing module 808.

Although at least some aspects of the examples described herein with reference to the drawings comprise computer processes performed in processing systems or processors, examples described herein also extend to computer programs, for example computer programs on or in a carrier, adapted for putting the examples into practice. The carrier may be any entity or device capable of carrying the program.

It will be appreciated that the apparatus 800 may comprise more, fewer and/or different components from those depicted in FIG. 8.

The apparatus 800 may be located in a single location or may be distributed in multiple locations. Such locations may be local or remote.

The techniques described herein may be implemented in software or hardware, or may be implemented using a combination of software and hardware. They may include configuring an apparatus to carry out and/or support any or all of techniques described herein.

Various measures (for example, a physical adapter, a method and a computer program) are provided wherein a physical adapter receives at least one data stream comprising at least: data usable to derive a rendition of a signal at a first level of quality in a tiered hierarchy including multiple levels of quality; and reconstruction data indicating how to reconstruct a rendition of the signal at a second, higher level of quality in the tiered hierarchy using the rendition of the signal at the first level of quality. The physical adapter reconstructs the rendition of the signal at the second, higher level of quality based at least on the rendition of the signal at the first level of quality and the reconstruction data. The physical adapter outputs at least the reconstructed rendition of the signal and/or data derived from the reconstructed rendition of the signal. The physical adapter is configured to be connectable to signal processing equipment. The signal processing equipment is configured to output the data usable to derive the rendition of the signal at the first level of quality and the physical adapter being configured to increase the quality of the rendition of the signal relative to the first level of quality.

The physical adapter may be configured to receive the data usable to derive the rendition of the signal at the first level of quality and the reconstruction data in a multiplexed data stream.

The multiplexed data stream may be a Moving Picture Experts Group, MPEG, transport stream.

The physical adapter may be configured to extract the data usable to derive the rendition of the signal at the first level of quality and the reconstruction data from the multiplexed data stream based on identifying one or more packet identifiers, PIDs, associated with the data usable to derive the rendition of the signal at the first level of quality and one or more packet identifiers, PIDs, associated with the reconstruction data in the transport stream.

The physical adapter may be configured to receive the data usable to derive the rendition of the signal at the first level of quality in an encoded form.

The physical adapter may be configured to decode the data usable to derive the received rendition of the signal at the first level of quality. The physical adapter may be configured to derive the rendition of the signal at the first level of quality using the decoded data usable to derive the received rendition of the signal at the first level of quality.

The physical adapter may be configured to use the derived rendition of the signal at the first level of quality and the reconstruction data to reconstruct the rendition of the signal at the second, higher level of quality.

The physical adapter may be configured to encode the reconstructed rendition of the signal at the second, higher level of quality prior to said output of said reconstructed rendition of the signal at the second, higher level of quality and/or the data derived from the reconstructed rendition of the signal at the second, higher level of quality.

The physical adapter may be configured to receive the data usable to derive the rendition of the signal at the first level of quality and the reconstruction data via a common physical interface of the physical adapter.

The physical adapter may be configured to output the reconstructed rendition of the signal at the second, higher level of quality and/or the data derived from the reconstructed rendition of the signal at the second, higher level of quality via the common physical interface.

The common physical interface may be a Digital Video Broadcast-Common Interface, DVB-CI.

The physical adapter may be configured to output the at least the reconstructed rendition of the signal and/or the data derived from reconstructed rendition of the signal to the signal processing equipment.

The signal processing equipment may be a television.

The signal processing equipment may be a set-top box, STB.

The physical adapter may be in the form of a conditional-access module, CAM.

The physical adapter may be configured to receive the data usable to derive the rendition of the signal at the first level of quality via a first physical interface of the physical adapter and to receive the reconstruction data via a second, different physical interface of the physical adapter.

The first physical interface may be a High-Definition Multimedia Interface, HDMI.

The second physical interface may be a Universal Serial Bus, USB, interface.

The physical adapter may be configured to receive synchronisation data from the signal processing equipment, the synchronisation data being usable by the physical adapter to reconstruct the rendition of the signal at the second, higher level of quality.

The physical adapter may be configured to output said at least the reconstructed rendition of the signal at the second, higher level of quality and/or the data derived from the reconstructed rendition of the signal at the second, higher level of quality via a third physical interface of the physical adapter, the third physical interface being different from the first and the second physical interfaces.

The third physical interface may be a High-Definition Multimedia Interface, HDMI.

The physical adapter may be configured to decrypt the data usable to derive the rendition of the signal at the first level of quality.

The physical adapter may be configured to use High-bandwidth Digital Content Protection, HDCP, to decrypt the data usable to derive the rendition of the signal at the first level of quality.

The physical adapter may be configured to encrypt the reconstructed rendition of the signal and/or encrypt the data derived from the reconstructed rendition of the signal.

The physical adapter may be configured to use High-bandwidth Digital Content Protection, HDCP, to encrypt the reconstructed rendition of the signal and/or encrypt the data derived from the reconstructed rendition of the signal.

The signal processing equipment may be a set-top box, STB.

The physical adapter may be configured to output said at least the reconstructed rendition of the signal at the second, higher level of quality and/or the data derived from the reconstructed rendition of the signal at the second, higher level of quality to a television.

The physical adapter may be in the form of a dongle.

The physical adapter may be configured to be powered by the signal processing equipment.

The at least one data stream may comprise additional data associated with the signal. The physical adapter may be configured to: extract the additional data from the at least one data stream; and combine the additional data with the rendition of the signal at the second, higher level of quality and/or the data derived from the rendition of the signal at the second, higher level of quality prior to said outputting.

The additional data may comprise audio data.

The signal may comprise a video signal.

Various measures (for example, signal processing equipment, a method and a computer program) are provided wherein signal processing equipment receives at least one data stream comprising at least: data usable to derive a rendition of a signal at a first level of quality in a tiered hierarchy including multiple levels of quality; and reconstruction data indicating how to reconstruct a rendition of the signal at a second, higher level of quality in the tiered hierarchy using the rendition of the signal at the first level of quality. The signal processing equipment extracts the data usable to derive the rendition of the signal at the first level of quality and the reconstruction data from the at least one data stream. The signal processing equipment outputs the data usable to derive the rendition of the signal at the first level of quality. The signal processing equipment outputs the reconstruction data. The signal processing equipment is configured to be connectable to a physical adapter. The signal processing equipment is configured to output the data usable to derive the rendition of the signal at the first level of quality and the physical adapter is configured to increase the quality of the rendition of the signal relative to the first level of quality.

The signal processing equipment may be configured to output the data usable to derive the rendition of the signal at the first level of quality via a first physical interface of the signal processing equipment and to output the reconstruction data via a second, different physical interface of the signal processing equipment.

The first physical interface may be a High-Definition Multimedia Interface, HDMI.

The second physical interface may be a Universal Serial Bus, USB, interface.

The signal processing equipment may be configured to output the data usable to derive the rendition of the signal at the first level of quality and the reconstruction data via a common physical interface of the signal processing equipment.

The common physical interface may be a High-Definition Multimedia Interface, HDMI.

The signal processing equipment may be configured to receive the data usable to derive the rendition of the signal at the first level of quality and the reconstruction data in a multiplexed data stream.

The multiplexed data stream may be a Moving Picture Experts Group, MPEG, transport stream.

The signal processing equipment may be configured to output synchronisation data, the synchronisation data being usable to reconstruct the rendition of the signal at the second, higher level of quality.

The signal processing equipment may be configured to encrypt at least the data usable to derive the rendition of the signal at the first level of quality.

The signal processing equipment may be configured to use High-bandwidth Digital Content Protection, HDCP, to encrypt said at least the data usable to derive the rendition of the signal at the first level of quality.

The at least one data stream may comprise additional data associated with the signal. The signal processing equipment may be configured to: extract the additional data from the at least one data stream; and output the additional data.

The additional data may comprise audio data.

The signal processing equipment may be a set-top box, STB.

The physical adapter may be in the form of a dongle.

The signal processing equipment may be configured to provide power to the physical adapter.

The signal may comprise a video signal.

In an example, the further equipment (which may be signal processing equipment) is configured to receive at least a reconstructed rendition of a signal and/or data derived from the reconstructed rendition of the signal from a physical adapter, the reconstructed rendition of the signal having been reconstructed by the physical adapter based at least on a rendition of the signal at a first level of quality in a tiered hierarchy including multiple levels of quality and on reconstruction data indicating how to reconstruct a rendition of the signal at a second, higher level of quality in the tiered hierarchy, the reconstructed rendition of the signal being at the second, higher level of quality, the physical adapter is configured to be connectable to signal processing equipment, the signal processing equipment being configured to output data usable by the physical adapter to derive the rendition of the signal at the first level of quality and the physical adapter being configured to increase the quality of the rendition of the signal relative to the first level of quality. The further equipment is also configured to process the received at least the reconstructed rendition of the signal and/or the data derived from the reconstructed rendition of the signal.

The above embodiments are to be understood as illustrative examples. Further embodiments are envisaged.

For example, several examples above relate to receiving video data in a broadcast transport stream, such as an MPEG-TS. Video data may however be received in other ways. For example, data usable to derive a rendition of a video signal at a first level of quality may be stored on a Blu-ray disc according to a suitable Blu-ray video format. Reconstruction data may also be stored on the Blu-ray disc, for example as metadata. Signal processing equipment reading the data stored on the Blu-ray disc may be communicatively coupled to a physical adapter that can use the rendition of the video signal at the first level of quality (e.g. HD) and the reconstruction data to reconstruct a rendition of the video signal at a second, higher level of quality (e.g. UHD), using the rendition of the video signal at the first level of quality (e.g. HD) as a baseline for reconstructing the rendition of the video signal at a second, higher level of quality (e.g. UHD).

In an example described above, signal processing equipment (such as an STB) has an HDMI 1.4 connection to a physical adapter. As also described above, an HDMI 1.4 connection may not have sufficient capacity to support transmission of video data above a threshold quality. In another example, the signal processing equipment is modified to have a HDMI 2.0 connection, or other suitable connection, that has sufficient capacity to carry video data above the threshold quality. In such an example, the additional functionality provided to the signal processing equipment by the physical adapter could be incorporated into the signal processing equipment itself, without the need for the physical adapter.

An example is described above in which signal processing equipment, for example an STB, is configured (for example modified) to output video data over one physical connection (e.g. an HDMI connection) and reconstruction data over a different physical connection (e.g. a USB connection). In another example, the signal processing equipment is configured (for example modified) to output the video data and the reconstruction data over the same physical connection (e.g. the HDMI connection). This may require modification of the chipset. In such an example, the physical adapter would receive both the video data and the enhancement data over a single physical connection (e.g. the HDMI connection) and would reconstruct the higher-quality video in substantially the same manner as that described above. This may avoid the need to use multiple different physical connections between the signal processing equipment and the physical adapter (e.g. an HDMI connection and a USB connection). In such an example, the single physical connection may output both the video data and the reconstruction data. In such an example, the signal processing equipment may be able to output a rendition of a video signal at a first level of quality and the reconstruction data to the physical adapter over an HDMI 1.4 connection. The physical adapter then reconstructs a rendition of the video signal at a second, higher level of quality and outputs this data over an HDMI 2.0 connection.

Examples have been described above in which data usable to derive a rendition of a signal at a first level of quality and reconstruction data are received in a multiplexed data stream. For example, the multiplexed data stream may be an MPEG-TS.

In another example, the data usable to derive a rendition of a signal at a first level of quality and reconstruction data are received in separate, non-multiplexed streams. For example, data usable to derive a rendition of a signal at a first level of quality may be received in a broadcast transport stream and the reconstruction data may be received as over-the-top (OTT) content via the Internet. The data usable to derive a rendition of a signal at a first level of quality would be synchronised with the reconstruction data and the synchronised data would then be used to reconstruct the rendition of the signal at the second, higher level of quality.

It is to be understood that any feature described in relation to any one embodiment may be used alone, or in combination with other features described, and may also be used in combination with at least one features of any other of the embodiments, or any combination of any other of the embodiments. Furthermore, equivalents and modifications not described above may also be employed without departing from the scope of the invention, which is defined in the accompanying claims.

What is claimed is:
1. A physical adapter comprising:
   a single common physical interface configured to receive at least one data stream from a signal processing equipment;
   a demultiplexer configured to process the at least one data stream and output:

a first extracted data stream comprising data usable to derive a rendition of a signal at a first level of quality in a tiered hierarchy including multiple levels of quality; and a second extracted data stream comprising reconstruction data produced by processing a rendition of the signal at a second, higher level of quality in the tiered hierarchy and indicating how to reconstruct the rendition of the signal at the second level of quality using the rendition of the signal at the first level of quality, wherein the reconstruction data is indicative of a difference between the rendition of the signal at the second, higher level of quality and a further rendition of the signal at the second, higher level of quality, wherein the further rendition of the signal is derived from up-sampling the rendition of the signal at the first level of quality;

a first decoder configured to decode the first extracted data stream and to output a first decoded data stream;

a second decoder configured to process the first decoded data stream and the second extracted data stream and to reconstruct the rendition of the signal at the second, higher level of quality based at least on the rendition of the signal at the first level of quality and the reconstruction data;

wherein the single common physical interface is further configured to output to the signal processing equipment at least the reconstructed rendition of the signal and/or data derived from the reconstructed rendition of the signal, wherein an encoder is configured to encode the reconstructed rendition of the signal at the second, higher level of quality prior to the output of said reconstructed rendition of the signal at the second, higher level of quality and/or the data derived from the reconstructed rendition of the signal at the second, higher level of quality, the encoder being connected to and separate from the second decoder and separate from the first decoder, wherein the physical adapter is configured to be connectable to the signal processing equipment via the single common physical interface and, when connected to the signal processing equipment, the physical adapter being configured to increase the quality of the rendition of the signal relative to the first level of quality by outputting to the signal processing equipment at least the reconstructed rendition of the signal and/or data derived from the reconstructed rendition of the signal.

2. A physical adapter according to claim 1, wherein the at least one data stream is a Moving Picture Experts Group, MPEG, transport stream, and wherein the physical adapter is configured to extract the data usable to derive the rendition of the signal at the first level of quality and the reconstruction data from the data stream based on identifying one or more packet identifiers, PIDs, associated with the data usable to derive the rendition of the signal at the first level of quality and one or more packet identifiers, PIDs, associated with the reconstruction data in the transport stream.

3. A physical adapter according to claim 1, the physical adapter being configured to receive the data usable to derive the rendition of the signal at the first level of quality in an encoded form.

4. A physical adapter according to claim 1, the physical adapter further comprising:

a multiplexer configured to receive and multiplex an output of the encoder and a third extracted data stream from the demultiplexer and to provide multiplexed data to the common physical interface for output.

5. A physical adapter according to claim 4, wherein the third extracted data stream comprises audio data.

6. A physical adapter according to claim 1, wherein the physical adapter is a conditional-access module, CAM, for the signal processing equipment.

7. A method at a physical adapter, the method comprising:
receiving at least one data stream from a signal processing equipment via a single common physical interface;
processing the at least one data stream to output:
a first extracted data stream comparing data usable to derive a rendition of a signal at a first level of quality in a tiered hierarchy including multiple levels of quality; and
a second extracted data stream comprising reconstruction data produced by processing a rendition of the signal at a second, higher level of quality in the tiered hierarchy and indicating how to reconstruct the rendition of the signal at the second level of quality using the rendition of the signal at the first level of quality, wherein the reconstruction data is indicative of a difference between the rendition of the signal at the second, higher level of quality and a further rendition of the signal at the second, higher level of quality, wherein the further rendition of the signal is derived from up-sampling the rendition of the signal at the first level of quality;
decoding, at a first decoder, the first extracted data stream to output a first decoded data stream;
processing, at a second decoder, the first decoded data stream and the second extracted data stream to reconstruct the rendition of the signal at the second, higher level of quality based at least on the rendition of the signal at the first level of quality and the reconstruction data;
outputting at least the reconstructed rendition of the signal and/or data derived from the reconstructed rendition of the signal; and
encoding, at an encoder that is different from the first and second decoders, the reconstructed rendition of the signal at the second, higher level of quality prior to said outputting of said reconstructed rendition of the signal at the second, higher level of quality and/or the data derived from the reconstructed rendition of the signal at the second, higher level of quality,
wherein the physical adapter is configured to be connectable to the signal processing equipment via the single common physical interface and, when connected to the signal processing equipment via the single common physical interface, to enhance the functionality of the signal processing equipment, the physical adapter being configured to increase the quality of the rendition of the signal relative to the first level of quality when the at least the reconstructed rendition of the signal and/or data derived from the reconstructed rendition of the signal is output to the signal processing equipment.

8. A method according to claim 7, wherein the data usable to derive the rendition of the signal at the first level of quality is received in an encoded form.

9. A method according to claim 7, comprising:
decoding the data usable to derive the received rendition of the signal at the first level of quality;
deriving the rendition of the signal at the first level of quality using the decoded data usable to derive the received rendition of the signal at the first level of quality; and using the derived rendition of the signal at the first level of quality and the reconstruction data to reconstruct the rendition of the signal at the second, higher level of quality.

10. A physical adapter according to claim 5, wherein the output of the common physical interface comprises an MPEG-2 encoded stream.

11. A computer program product comprising one or more computer-readable storage media having thereon computer-executable instructions that are structured such that, when executed by one or more processors of a computing system, cause the computing system to perform a method at a physical adapter, the method comprising:
    receiving at least one data stream from a signal processing equipment via a single common physical interface;
    processing the at least one data stream to output:
        a first extracted data stream comparing data usable to derive a rendition of a signal at a first level of quality in a tiered hierarchy including multiple levels of quality; and
        a second extracted data stream comprising reconstruction data produced by processing a rendition of the signal at a second, higher level of quality in the tiered hierarchy and indicating how to reconstruct the rendition of the signal at the second level of quality using the rendition of the signal at the first level of quality, wherein the reconstruction data is indicative of a difference between the rendition of the signal at the second, higher level of quality and a further rendition of the signal at the second, higher level of quality, wherein the further rendition of the signal is derived from up-sampling the rendition of the signal at the first level of quality;
    decoding, at a first decoder, the first extracted data stream to output a first decoded data stream; processing, at a second decoder, the first decoded data stream and the second extracted data stream to reconstruct the rendition of the signal at the second, higher level of quality based at least on the rendition of the signal at the first level of quality and the reconstruction data;
    outputting at least the reconstructed rendition of the signal and/or data derived from the reconstructed rendition of the signal; and
    encoding, at an encoder that is different from the first and second decoders, the reconstructed rendition of the signal at the second, higher level of quality prior to said outputting of said reconstructed rendition of the signal at the second, higher level of quality and/or the data derived from the reconstructed rendition of the signal at the second, higher level of quality,
    wherein the physical adapter is configured to be connectable to the signal processing equipment via the single common physical interface and, when connected to the signal processing equipment via the single common physical interface, to enhance the functionality of the signal processing equipment, the physical adapter being configured to increase the quality of the rendition of the signal relative to the first level of quality when the at least the reconstructed rendition of the signal and/or data derived from the reconstructed rendition of the signal is output to the signal processing equipment.

12. A computer program product of claim 11, wherein the data usable to derive the rendition of the signal at the first level of quality is received in an encoded form.

13. A computer program product of claim 11, comprising:
    decoding the data usable to derive the received rendition of the signal at the first level of quality;
    deriving the rendition of the signal at the first level of quality using the decoded data usable to derive the received rendition of the signal at the first level of quality; and
    using the derived rendition of the signal at the first level of quality and the reconstruction data to reconstruct the rendition of the signal at the second, higher level of quality.

* * * * *